US010726405B2

(12) United States Patent
Wu

(10) Patent No.: US 10,726,405 B2
(45) Date of Patent: Jul. 28, 2020

(54) SYSTEM AND METHOD FOR IMPLEMENTING NETWORKING TRANSFER SERVICE

(71) Applicant: Fan Wu, Beijing (CN)

(72) Inventor: Fan Wu, Beijing (CN)

(*) Notice: Subject to any disclaimer, the term of this patent is extended or adjusted under 35 U.S.C. 154(b) by 767 days.

(21) Appl. No.: 15/502,852

(22) PCT Filed: Jun. 30, 2015

(86) PCT No.: PCT/CN2015/082933
§ 371 (c)(1),
(2) Date: Feb. 9, 2017

(87) PCT Pub. No.: WO2016/026353
PCT Pub. Date: Feb. 25, 2016

(65) Prior Publication Data
US 2017/0243185 A1    Aug. 24, 2017

(30) Foreign Application Priority Data
Aug. 22, 2014 (CN) .......................... 2014 1 0418794

(51) Int. Cl.
G06Q 20/14  (2012.01)
H04L 12/46  (2006.01)
(Continued)

(52) U.S. Cl.
CPC ......... *G06Q 20/145* (2013.01); *H04L 5/0055* (2013.01); *H04L 12/46* (2013.01);
(Continued)

(58) Field of Classification Search
CPC .. G06Q 20/145; H04W 12/003; H04W 12/06; H04W 60/00; H04W 76/14;
(Continued)

(56) References Cited

U.S. PATENT DOCUMENTS 9,307,555 B2    4/2016  Zhou
2007/0033197 A1*  2/2007  Scherzer ................. H04L 63/10
(Continued)

FOREIGN PATENT DOCUMENTS

CN    103533608 A    1/2014
CN    103582068 A    2/2014
(Continued)

OTHER PUBLICATIONS

International Search Report dated Oct. 5, 2015 for PCT/CN2015/082933.
(Continued)

*Primary Examiner* — James D Nigh
(74) *Attorney, Agent, or Firm* — Pearne & Gordon LLP

(57) ABSTRACT

Disclosed is a method for implementing a networking transfer service, comprising the following steps: (1) user registration; (2) initial setting of supplier information, role activation of a supplier and wireless hotspot activation of the supplier; (3) a networking transfer service, comprising that a demander terminal extracts supplier service unit price information from a codeword of a wireless hotspot SSID of the supplier; (4) charging of the networking transfer service; and (5) termination of the networking transfer service. A system is provided and comprises a demander terminal, a supplier terminal and a networking transfer server. The demander terminal comprises a networking transfer service demander management module, a WLAN module and a human-machine interface; the supplier terminal comprises a networking transfer service supplier management module, a charging module, a supplier information field storage space, a routing control module, a wireless hotspot module, an Internet connection module and a human-machine interface; the WLAN module of the demander interacts with the wireless hotspot module of the supplier in a wireless man-
(Continued)

ner; the supplier terminal is connected to the Internet and the networking transfer server through the Internet connection module.

19 Claims, 16 Drawing Sheets

(51) Int. Cl.
| | |
|---|---|
| *H04W 12/00* | (2009.01) |
| *H04L 5/00* | (2006.01) |
| *H04L 29/12* | (2006.01) |
| *H04L 29/06* | (2006.01) |
| *H04W 12/06* | (2009.01) |
| *H04W 60/00* | (2009.01) |
| *H04W 8/18* | (2009.01) |
| *H04W 76/14* | (2018.01) |
| *G06K 9/00* | (2006.01) |
| *H04W 84/12* | (2009.01) |

(52) U.S. Cl.
CPC ....... *H04L 61/6081* (2013.01); *H04L 63/083* (2013.01); *H04L 63/101* (2013.01); *H04W 12/003* (2019.01); *H04W 12/06* (2013.01); *H04W 60/00* (2013.01); *G06K 9/00087* (2013.01); *G06K 9/00288* (2013.01); *G06K 9/00892* (2013.01); *H04L 61/2007* (2013.01); *H04L 63/0861* (2013.01); *H04W 8/18* (2013.01); *H04W 76/14* (2018.02); *H04W 84/12* (2013.01)

(58) Field of Classification Search
CPC ...... H04W 8/18; H04W 84/12; H04L 5/0055; H04L 12/46; H04L 61/6081; H04L 63/083; H04L 63/101; H04L 61/2007; H04L 63/0861; G06K 9/00087; G06K 9/00288; G06K 9/00892
USPC .......................................................... 705/50
See application file for complete search history.

(56) References Cited

U.S. PATENT DOCUMENTS

| | | | | |
|---|---|---|---|---|
| 2009/0022076 A1* | 1/2009 | Canpolat | ............... | H04W 48/18 370/310 |
| 2010/0290337 A1* | 11/2010 | Suvi | ....... | H04W 12/08 370/217 |
| 2012/0254959 A1* | 10/2012 | Schmidt | .............. | H04L 63/0853 726/6 |
| 2012/0284785 A1* | 11/2012 | Salkintzis | ........... | H04L 63/0853 726/7 |
| 2013/0159711 A1 | 6/2013 | Kaal | | |
| 2014/0071974 A1* | 3/2014 | Watari | ................ | G06F 3/04883 370/338 |
| 2014/0181916 A1* | 6/2014 | Koo | ....................... | H04W 12/08 726/4 |
| 2014/0286323 A1* | 9/2014 | Hsu | ........................ | H04W 76/11 370/338 |
| 2016/0028697 A1* | 1/2016 | Shui | ....................... | H04W 48/20 713/168 |
| 2016/0070864 A1* | 3/2016 | Dotan | .................... | G06F 19/326 705/3 |
| 2017/0127276 A1* | 5/2017 | Koo | ....................... | H04W 12/06 |

FOREIGN PATENT DOCUMENTS

| | | |
|---|---|---|
| CN | 103596121 A | 2/2014 |
| CN | 103747096 A | 4/2014 |
| CN | 103906064 A | 7/2014 |
| CN | 103987060 A | 8/2014 |
| CN | 104219737 A | 12/2014 |
| CN | 104243262 A | 12/2014 |
| WO | 2013090866 A1 | 6/2013 |
| WO | 2013104252 A1 | 7/2013 |

OTHER PUBLICATIONS

International Preliminary Report on Patentability of corresponding PCT application PCT/CN2015/082933 dated Feb. 28, 2017.
First Office Action of corresponding Chinese application (priority application) dated Mar. 13, 2017.
Second Office Action of corresponding Chinese application (priority application) dated Sep. 18, 2017.

* cited by examiner

```
┌─────────────────────────────────────────────────────────────────────┐
│ THE NETWORKING SWITCHING SERVER ESTABLISHES A "SUPPLIER INFORMATION │
│ SETTING FIELD" STORAGE SPACE AT A SERVER SIDE FOR THE SUPPLIER USER │
└─────────────────────────────────────────────────────────────────────┘
                                    ↓
┌─────────────────────────────────────────────────────────────────────┐
│ THE NETWORKING SWITCHING SERVER SENDS A "MESSAGE OF INITIAL SETTING │
│ OF THE SUPPLIER INFORMATION" TO THE SUPPLIER USER TERMINAL          │
└─────────────────────────────────────────────────────────────────────┘
                                    ↓
┌─────────────────────────────────────────────────────────────────────┐
│ THE SUPPLIER USER TERMINAL STORES THE CONTENTS OF                   │
│ A "MESSAGE OF INITIAL SETTING OF THE SUPPLIER INFORMATION" IN THE   │
│ "SUPPLIER INFORMATION SETTING FIELD" STORAGE SPACE                  │
└─────────────────────────────────────────────────────────────────────┘
                                    ↓
┌─────────────────────────────────────────────────────────────────────┐
│ THE SUPPLIER USER TERMINAL GENERATES A CODE WORD OF SUPPLIER        │
│ WIRELESS HOTSPOT SERVICE IDENTIFIER, I.E. A "SUPPLIER SSID" CODE    │
│ WORD                                                                │
└─────────────────────────────────────────────────────────────────────┘
                                    ↓
┌─────────────────────────────────────────────────────────────────────┐
│ THE SUPPLIER USER TERMINAL STORES THE NEWLY GENERATED "SUPPLIER     │
│ SSID" CODE WORD INTO THE "SUPPLIER INFORMATION SETTING FIELD"       │
│ STORAGE SPACE AND REPORTS A "SUPPLIER ROLE SERVICE MESSAGE" TO THE  │
│ NETWORKING SWITCHING SERVER                                         │
└─────────────────────────────────────────────────────────────────────┘
                                    ↓
┌─────────────────────────────────────────────────────────────────────┐
│ THE NETWORKING SWITCHING SERVER STORES THE CONTENTS OF THE          │
│ "SUPPLIER ROLE SERVICE MESSAGE" IN THE "SUPPLIER INFORMATION        │
│ SETTING FIELD" STORAGE SPACE AT THE SERVER SIDE FOR THE SUPPLIER    │
│ USER                                                                │
└─────────────────────────────────────────────────────────────────────┘
```

FIG. 3

```
┌─────────────────────────────────────────────────────────────────────┐
│             THE SUPPLIER USER ACTIVATES THE SUPPLIER ROLE           │
└─────────────────────────────────────────────────────────────────────┘
                                    ↓
┌─────────────────────────────────────────────────────────────────────┐
│ THE SUPPLIER USER TERMINAL JUDGES WHETHER THE WIRELESS HOTSPOT      │
│ MODULE OF THE SUPPLIER USER TERMINAL HAS THE STARTING CONDITION OF  │
│ THE WIRELESS HOTSPOT OF THE SUPPLIER ACCORDING TO A CURRENT STATE   │
│ OF THE SUPPLIER USER TERMINAL AND THE VALUE OF THE "SUPPLIER        │
│ INFORMATION FIELD"                                                  │
└─────────────────────────────────────────────────────────────────────┘
```

FIG. 4

THE DEMANDER TERMINAL EXTRACTS THE INFORMATION OF THE SERVICE UNIT PRICE OF THE SUPPLIER FROM THE SSID CODE WORD OF THE SEARCHED WIRELESS HOTSPOT OF THE SUPPLIER, SO AS TO FORM A CURRENTLY AVAILABLE SUPPLIER LIST

↓

THE DEMANDER TERMINAL DISPLAYS THE CURRENTLY AVAILABLE SUPPLIER LIST ON THE HUMAN-COMPUTER INTERFACE

↓

THE DEMANDER USER CAN SELECT THE FAVORITE SUPPLIER THROUGH THE HUMAN-COMPUTER INTERFACE

FIG. 11

THE DEMANDER TERMINAL CALLS AN ALGORITHM PRESET BY THE SYSTEM TO CALCULATE THE CORRESPONDING PASSWORD CODE WORD ACCORDING TO THE SUPPLIER SSID CODE WORD SELECTED BY THE DEMANDER USER

↓

THE DEMANDER TERMINAL LOGS IN THE SELECTED WIRELESS HOTSPOT OF THE SUPPLIER WITH THE CURRENTLY CALCULATED PASSWORD CODE WORD

↓

THE SUPPLIER TERMINAL ASSIGNS THE IP ADDRESS TO THE LOGGED-IN TERMINAL TO ESTABLISH WIRELESS CONNECTION

↓

THE ROUTER CONTROL MODULE OF THE SUPPLIER TERMINAL RELEASES AND ONLY RELEASES THE COMMUNICATION MESSAGE BETWEEN THE DEMANDER TERMINAL AND THE NETWORKING SWITCHING SERVER THROUGH ADOPTION OF AN IP FUNCTION AND A PORT FILTRATION FUNCTION

↓

THE AUTHENTICATION OF THE DEMANDER USER IS STARTED

FIG. 12

```
┌─────────────────────────────────────────────────────────────────────────┐
│ THE SUPPLIER TERMINAL RECEIVES THE REQUEST OF "TERMINATING THE SERVICE" │
│                          SENT BY THE SUPPLIER USER                      │
└─────────────────────────────────────────────────────────────────────────┘
                                      │
                                      ▼
┌─────────────────────────────────────────────────────────────────────────┐
│ THE SUPPLIER TERMINAL IMMEDIATELY STOPS SENDING THE CHARGING RECORD     │
│ LISTS TO THE DEMANDER TERMINAL AND THE NETWORKING SWITCHING SERVER,     │
│ AND THE ROUTER CONTROL MODULE OF THE SUPPLIER TERMINAL RELEASES AND     │
│ ONLY RELEASES THE COMMUNICATION MESSAGE BETWEEN THE DEMANDER            │
│ TERMINAL AND THE NETWORKING SWITCHING SERVER; THE SUPPLIER TERMINAL     │
│ SENDS THE REQUEST MESSAGE OF "TERMINATING THE SERVICE" TO THE DEMANDER  │
│ TERMINAL AND THE NETWORKING SWITCHING SERVER RESPECTIVELY; THE REAL-TIME│
│ BOUNCE DISPLAY OF THE CURRENT CHARGING INFORMATION IS IMMEDIATELY FROZEN│
│ IF THE SUPPLIER TERMINAL HAS THE REAL-TIME BOUNCE DISPLAY OF THE CURRENT│
│          CHARGING INFORMATION ON THE HUMAN-COMPUTER INTERFACE           │
└─────────────────────────────────────────────────────────────────────────┘
                                      │
                                      ▼
┌─────────────────────────────────────────────────────────────────────────┐
│ THE DEMANDER TERMINAL FREEZES THE REAL-TIME BOUNCE DISPLAY OF THE       │
│ CURRENT CHARGING INFORMATION, DISPLAYS A PROMPT IN REGARD TO            │
│ "TERMINATING THE SERVICE DUE TO THE REASON OF THE SUPPLIER" ON THE      │
│ HUMAN-COMPUTER INTERFACE, SENDS THE MESSAGE OF "TERMINATING THE         │
│ SERVICE" TO THE SERVER AND THEN BREAKS THE WIRELESS CONNECTION WITH     │
│                              THE SUPPLIER                               │
└─────────────────────────────────────────────────────────────────────────┘
                                      │
                                      ▼
┌─────────────────────────────────────────────────────────────────────────┐
│ THE SERVER SENDS THE CONFIRMATION MESSAGE OF "TERMINATING THE SERVICE"  │
│          TO THE SUPPLIER TERMINAL OF THE CURRENT SERVICE                │
└─────────────────────────────────────────────────────────────────────────┘
                                      │
                                      ▼
┌─────────────────────────────────────────────────────────────────────────┐
│ THE SUPPLIER TERMINAL BREAKS THE WIRELESS CONNECTION WITH THE DEMANDER  │
│ AND SENDS THE CONFIRMATION MESSAGE OF "TERMINATING THE SERVICE" TO THE  │
│                                  SERVER                                 │
└─────────────────────────────────────────────────────────────────────────┘
```

FIG. 17

THE NETWORKING SWITCHING SERVICE TERMINAL DETECTS A COMMUNICATION EXCEPTION (BETWEEN THE NETWORKING SWITCHING SERVICE TERMINAL AND OTHER COMMUNICATING NETWORKING SWITCHING SERVICE TERMINALS OR THE NETWORKING SWITCHING SERVICE SERVER)

THE NETWORKING SWITCHING SERVICE TERMINAL DOES NOT OUTPUT THE NEW CHARGING INFORMATION; IF THE NETWORKING SWITCHING SERVICE TERMINAL HAS THE REAL-TIME BOUNCE DISPLAY OF THE CURRENT CHARGING INFORMATION ON THE HUMAN-COMPUTER INTERFACE, THE REAL-TIME BOUNCE DISPLAY OF THE CURRENT CHARGING INFORMATION IS FROZEN, AND A PROMPT IN REGARD TO A "SERVICE INTERRUPTION CAUSED BY THE COMMUNICATION EXCEPTION" IS DISPLAYED ON THE HUMAN-COMPUTER INTERFACE FOR THE SUPPLIER USER

FIG. 20

SYSTEM AND METHOD FOR IMPLEMENTING NETWORKING TRANSFER SERVICE

FIELD OF THE INVENTION

The present disclosure relates to the technical field of the Internet, and particularly to a system and method for implementing networking transfer service.

BACKGROUND OF THE INVENTION

As science and technology develops nowadays, high-speed development of fields such as the Internet and communications provides various convenience to people's life. As home/personal wireless access point technology and network cloud develop, more and more users pursue for access to the Internet at any time and at any place. Specifically, the personal wireless access point stated here means allowing a personal terminal (e.g., a mobile phone or a portable wireless router such as Mifi or household wireless router) to become a wireless network transmitter, generally speaking, a router capable of transmitting a signal so that the third party's devices (such as a mobile phone', a tablet computer' and a mp4') enabling wireless network may all receive the signal. Successful access to the network may be accomplished through a password which is set after verification on the personal terminal (a mobile phone or Mifi or household wireless router). However, network traffic of an individual user and electrical power amount of the personal terminal are both limited, so it is difficult to support the use of the third party in a too long time period. In addition, it is also a tough problem to calculate in real time the network traffic used from other persons, and calculate and pay resultant charges.

In the prior art, there exist problems such as non-real-time display of a real-time traffic state and a consumption sum as well as untimeliness of service termination. Furthermore, there is a case in which unclear traffic causes unclear charges when charges are paid, and this case causes extreme inconvenience to the use of the user.

SUMMARY OF THE INVENTION

An object of the present invention is to provide a user-controlled networking capability transfer service system. Using this service system, a supplier user may provide Internet networking transfer service for a demander user by transferring its own Internet networking capability via a wireless access point. Meanwhile, the supplier user may gain benefits by means of provision of the Internet networking transfer service and according to provided networking traffic or networking time, and may display traffic, time length and consumption situations in real time, and instantly stop service according to the user's demand. Specifically, there is provided a method of implementing networking transfer service system, including the following steps:

(1) User registration: the user registers on the networking transfer service system, obtains a sole user identifier of the whole system, sets a system login password and becomes a user of networking transfer service;

(2) Initial setting of supplier information, supplier role activation;

Wherein in the step of initial setting of supplier information, the networking transfer service system generates for the supplier user a supplier wireless hotspot service identifier containing information of a service supplier feature code of the present service and information of "service unit price of the networking transfer service provided by the user" in a codeword, namely, a "supplier SSID" codeword;

In the step of supplier wireless hotspot activation, the SSID of a wireless hotspot module of the networking transfer service supplier terminal is set as the "supplier SSID" codeword; and the supplier terminal invokes a supplier SSID codeword-login password codeword mapping rule preset in the system, and calculates a corresponding login password codeword according to the current "supplier SSID" codeword, and sets the codeword of the login password as a login password of a wireless hotspot of the networking transfer service supplier terminal;

(3) Establishing the networking transfer service:

(3.1) Searching for the supplier wireless hotspot:

(3.1.1) Sending a networking transfer service request to a networking transfer service demander management module of the networking transfer service terminal;

(3.1.2) After the networking transfer service demander management module of the networking transfer service terminal receives the networking transfer service request, the networking transfer service terminal, as the demander terminal of the networking transfer service, executes the following steps:

(3.1.2.1) Detecting whether a WLAN module of the user terminal has already been activated; when the WLAN module has not yet been activated, activating the WLAN module of the terminal;

(3.1.2.2) Searching for nearby networking transfer service supplier wireless hotspot;

(3.2) Selecting a supplier:

The networking transfer service demander management module of the demander terminal extracts supplier service unit price information from the codeword of a searched supplier wireless hotspot SSID to form a copy of currently-available supplier listing; the copy of listing may include the following information of the supplier: supplier SSID, supplier service unit price, and supplier wireless quality;

The demander terminal displays information in the currently-available supplier listing on a human-machine interface; the user may select the supplier from the supplier listing via the human-machine interface;

(3.3) Logging in the supplier wireless hotspot:

(3.3.1) The networking transfer service demander management module invokes a supplier SSID codeword-login password codeword mapping rule preset in the system, and calculates a corresponding password codeword according to the supplier SSID codeword currently selected by the user; the WLAN module of the demander terminal uses the login password codeword to log in the supplier wireless hotspot currently selected by the user; the supplier terminal allocates an IP address to the login terminal and establishes wireless connection.

(3.3.2) A routing control module of the supplier terminal permits and only permits a communication message between the current login terminal and the networking transfer server;

(3.3.3) The networking transfer service demander terminal activates demander user authentication;

(3.4) Executing the demander user authentication;

(3.5) Providing access to the Internet for the demander user: After receiving "an acknowledgement message that the demander user authentication has passed" sent from the networking transfer server, the supplier terminal thinks by default that the supplier user provides charging services:

the routing control module of the supplier terminal permits all Internet transceiving messages of the demander terminal, and at the same time, a charging module of the supplier terminal activates the charging operation;

(4) Executing the networking transfer service charging:

(5) Terminating the networking transfer service: termination of the networking transfer service is classified into normal termination and abnormal termination.

The sole user identifier of the full system as stated in step (1) may be a registered user name; the system login password may be a password in the form of a character string, or user-specific human body features such as fingerprint, face, voice or the like.

In said step (1), the networking transfer service terminal and the networking transfer system server respectively store information related to user registration; when the networking transfer service is built in or associated with other application services, the user may share information registered for the present networking transfer service with other application services, and the aforesaid registration step is deemed as having been completed by default.

The step (2) further comprises:

(2.1) Initial setting of supplier information: upon completion of the user registration, the initial setting of supplier information may be performed;

Upon completion of the user registration, the networking transfer server opens a "supplier information field" storage space for the user on the service side, and endows a default value to each information field in the "supplier information field" storage space except for "supplier SSID" codeword, wherein it contains a service unit price of the networking transfer service provided by the user as the supplier to other demander users, including traffic unit price or time length unit price;

The networking transfer server sends "supplier information initial setting message" to the user terminal, and content of the message contains default values in the "supplier information field" except for "supplier SSID" codeword;

After the user terminal receives "supplier information initial setting message", the message content is stored in the "supplier information field" storage space; according to a service supplier feature code as appointed by the whole system, the user's feature identification code and "service unit price of the networking transfer service provided by the user" in the "supplier information field", the user terminal, according to a supplier SSID codeword encoding rule preset in the system, generates a codeword of the supplier wireless hotspot service identification, namely, "supplier SSID" codeword, including information of the service supplier feature code as appointed by the whole system, the user's feature identification code information and information of "service unit price of the networking transfer service provided by the user";

The user terminal stores the newly-generated "supplier SSID" codeword in the "supplier information field" storage space, and reports "supplier role service message" to the networking transfer server, the message may include various information content in the user "supplier information field", including the newly-generated "supplier SSID" codeword;

The networking transfer server stores the "supplier role service message" sent from the user terminal in the "supplier information field" storage space for the user on the server side;

(2.2) Supplier role activation:

The user may activate the supplier role via a human-machine interface;

When the user's supplier role is in an activated state, this indicates that the user is willingly to provide the networking transfer service for other users who need the service according to values of items of the "supplier information field" in the present terminal;

When the function of the supplier terminal of the networking transfer service is built in a dedicated terminal of the present service, for example, when the function of the networking transfer service supplier terminal is built in a MIFI terminal or portable router terminal similar to the MIFI, the aforesaid operation of activating the supplier role may be deemed to have been completed by default;

After the user's supplier role is in the activated state, the user terminal, according to a current state of the user terminal and a value of the "supplier information field", judges whether the wireless hotspot module of the user terminal has a condition for activating the supplier wireless hotspot;

(2.3) Supplier wireless hotspot activation

When the networking transfer service terminal currently has the condition for activating the supplier wireless hotspot, it execute the following steps:

Detecting whether the wireless hotspot module of the present user terminal has already been activated; When the wireless hotspot module has not yet been activated, the user terminal activates the wireless hotspot of the terminal according to a "supplier wireless hotspot activation scheme";

When the wireless hotspot module has already been activated, the user terminal closes the wireless hotspot, and re-activates the wireless hotspot according to the "supplier wireless hotspot activation scheme";

Subsequently, the user terminal executes step (2.4) "supplier service information reporting";

(2.4) Supplier service information reporting:

The networking transfer service user terminal reports the "supplier role service message" to the networking transfer sever; the message contains various information content of the user in the "supplier information field" storage space;

After receiving the "supplier role service information" reported by the present service user terminal, the networking transfer server stores content in the message in the "supplier information field" storage space for the user on the server side;

(2.5) Supplier information setting alteration:

Upon completion of the user's supplier information initial setting, the user terminal may display values of the "supplier information field" via the human-machine interface, and the user may alter values of other various information in the "supplier information field" except for the "supplier SSID";

After the user alters the values of the information in the "supplier information field", the user terminal stores the altered values of information in the "supplier information field" storage space of the present terminal; and executes the following steps:

(2.5.1) If the information altered by the user does not include the "service unit price of the networking transfer service provided by the user", executing step (2.4) "supplier service information reporting";

(2.5.2) If the information altered by the user includes the "service unit price of the networking transfer service provided by the user", according to a service supplier feature code as appointed by the whole system, the user's feature identification code and "service unit price of the networking transfer service provided by the user" in the "supplier information field", the user terminal, according to a supplier SSID codeword encoding rule preset in the system, generates a codeword of the supplier wireless hotspot service identification, namely, "supplier SSID" codeword, including information of the service supplier feature code as appointed by the whole system, the user's feature identification code information and information of "service unit price of the networking transfer service provided by the user";

The user terminal stores the aforesaid newly-generated "supplier SSID" codeword in the "supplier information field" storage space on the terminal side; subsequently, the user terminal executes the aforesaid step (2.3) "supplier wireless hotspot activation".

The information field in said step (2.1) may be a roaming location range, a time range and a terminal power amount range where the wireless hotspot module of the user terminal may activated as the supplier wireless hotspot, a service unit price of the networking transfer service provided by the user, and "supplier SSID" codeword;

The condition for activating as stated in said step (2.3) comprises: the user terminal currently has online networking with the Internet; and the current user terminal may activate the wireless hotspot under the condition of maintaining online networking with the Internet;

The "supplier wireless hotspot activation scheme" as stated in said step (2.3) is: the user terminal reads the current "supplier SSID" codeword from the "supplier information field" storage space, invokes a supplier SSID codeword-login password codeword mapping rule preset in the system, and calculates a corresponding login password codeword according to the current "supplier SSID" codeword; subsequently, the user terminal activates the wireless hotspot module and sets the aforesaid "supplier SSID" codeword and the corresponding login password codeword as the SSID and login password of the wireless hotspot of the present terminal;

Sending the request as stated in said step (3.1.1) is further as follows:

Manner A of sending the request: in the case that the user terminal is in an offline state, or terminal is not in a signal service area, or the user's traffic plan has already depleted, when the user has a need to access to the Internet, the demander user may, via a human-machine interface of the terminal, send a networking transfer service request to the networking transfer service demander management module of the networking transfer service terminal;

Manner B of sending the request: in the case that the networking transfer service is built in or associated with other application services, when said other application services need to access to the Internet but fail to connect with the network, said other application services may also send the networking transfer service request to the networking transfer service demander management module of the networking transfer service terminal;

Said step (3.1.2.2) further comprises the following steps:

(3.1.2.2.1) In the event of failure to find the networking transfer service supplier wireless hotspot after a search, the demander terminal notifies the demander user via the human-machine interface that currently there is no supplier user capable of supplying the networking transfer service nearby;

(3.1.2.2.2) If the networking transfer service supplier wireless hotspot is found after the search, step (3.2) selecting a supplier of claim 1 is executed;

Said step (3.4) further comprises the following steps:

(3.4.1) The demander user sends a server authentication request message to the networking transfer server, and the message at least includes a randomly-generated character string;

(3.4.2) After receiving the server authentication request message sent from the demander terminal, an authentication function module of the networking transfer server replies a server authentication response message to the demander, the message at least comprising a specific digit or character string which is relevant to the aforesaid randomly-generated digit or character string;

(3.4.3) The demander terminal checks content of the server authentication response message;

(3.4.4) If the check does not pass, the demander terminal returns to the networking transfer server a message to the effect that the server authentication request fails to pass, and then the demander terminal disconnects wireless connection with the current supplier terminal;

(3.4.5) If the check passes, the demander terminal sends the user authentication request message to the networking transfer server, the message may include: a sole user identifier of the whole system of the demander, a system login password of the demander, "supplier SSID" of the demander's current login, an IP address allocated by the supplier terminal to the supplier terminal or an MAC address of the supplier terminal;

(3.4.6) After receiving the user authentication request message sent from the demander, the authentication function module of the networking transfer server performs authentication processing: specifically, confirming the user's identification according to related information in the user authentication request message, and checking the user's credit conditions, and thereby judging whether to permit the user authentication request to pass;

(3.4.7) If the user authentication request has passed, the server sends to the supplier terminal currently providing the transfer service an acknowledgement message that the demander user authentication request has passed; content of the message contains: an IP address allocated by the supplier terminal to the demander terminal or an MAC address of the demander terminal;

(3.4.8) If the user authentication request has not passed, the networking transfer server returns, to the demander terminal, information that the user authentication request has not passed; then the server sends to the supplier terminal currently providing the transfer service an acknowledgement message that the demander user authentication request has not passed, and content of the message contains: an IP address allocated by the supplier terminal to the demander terminal or an MAC address of the demander terminal; after receiving the message that the authentication request has not passed, the supplier terminal disconnects wireless connection with the demander terminal.

Said step (4) further comprises the following:

(4.1) A charging module of the supplier terminal measures communication traffic and communication time length between the supplier terminal and the Internet as exported by the supplier terminal for the transfer service of this time, and forms in real time a charging recording list according to a measurement result; the charging recording list may include the following content: demander user name, supplier user name, supplier SSID, a recording time point, already-spent traffic, corresponding time length and corresponding sum at the corresponding time point; wherein, the recording time point may be as precise as 1 MS level or a multiple of 1 MS;

(4.2) The supplier terminal sends in real time the current charging recording list to the demander terminal, and meanwhile the supplier terminal sends the charging recording list to the networking transfer server in real time;

(4.3) According to the charging recording list received from the supplier terminal, the demander terminal, via the human-machine interface, displays information such as already-consumed traffic, corresponding time length and corresponding sum of the transfer service of this time at the current moment;

(4.4) The demander terminal sends to the networking transfer server in real time the current charging recording list already displayed on the human-machine interface of the demander terminal;

(4.5) After receiving the current charging recording list sent from the demander terminal, the networking transfer server sends it to the supplier terminal;

(4.6) After receiving the charging recording list sent from the networking transfer server, the supplier terminal may display, on the human-machine interface, information such as already-exported traffic, corresponding time length and corresponding income sum of the transfer service of this time; that is, if the supplier terminal displays the charging information in real time, the displayed information comes from the current charging recording list sent by the networking transfer server to the supplier terminal.

Said normal termination in said step (5) comprises:

(5.1) After sending a networking transfer service request to the networking transfer service terminal, the demander user may, at any time and via the human-machine interface, send a request to "terminate the service of this time" to the networking transfer service terminal;

When the networking transfer service terminal receives the request to "terminate service of this time" sent from the user, (5.1.1) If the networking transfer service terminal has not yet sent a message to the networking transfer server, stopping sending the message and disconnecting wireless connection with the supplier; the step ends up.

(5.1.2) If the networking transfer service terminal has already sent a message to the networking transfer server, but charging has not yet begun, the demander terminal sends a request message of "terminating service of this time" to the networking transfer server; and then disconnects wireless connection with the supplier; the step ends up.

(5.1.3) If charging has already begun, the following steps will be executed: A: After receiving the request to "terminate service of this time", the demander terminal immediately pauses real-time flicker display of the current charging information, meanwhile stops sending the charging recoding list to the networking transfer server, and sends the request message of "terminating service of this time" to the server; then disconnects wireless connection with the supplier;

B: After receiving the request message of "terminating service of this time" reported by the demander, the server sends the message of "terminating service of this time" to the currently-serving supplier terminal;

C: after receiving the message of "terminating service of this time" from the server, the supplier terminal immediately stops sending the charging recording list to the demander terminal and the server, and closes wireless connection with the demander, and then sends the acknowledgement message of "terminating service of this time" to the server; if the supplier terminal has real-time flicker display of the current charging information on the human-machine interface, the real-time flicker display of the current charging information will be paused immediately; the flow ends up.

Or, (5.2) After the supplier terminal begins to provide the networking transfer service to the demander user, the supplier user may, at any time and via the human-machine interface, send the request to "terminate service of this time" to the supplier terminal;

A: After the supplier terminal receives the request to "terminate service of this time" from the human-machine interface, the supplier terminal immediately stops sending the charging recoding list to the supplier terminal and the networking transfer server, and the routing control module of the supplier terminal employs an IP or port filtering function and permits and only permits a communication message between the supplier terminal and the networking transfer server; the supplier terminal sends the request message of "terminating service of this time" respectively to the demander terminal and the networking transfer server; if the supplier terminal has real-time flicker display of the current charging information on the human-machine interface, the real-time flicker display of the current charging information will be paused immediately;

B: After receiving the request to "terminate service of this time" from the supplier terminal, the demander terminal immediately pauses real-time flicker display of the current charging information, and displays on the human-machine interface a prompt "service is stopped due to the supplier"; the demander terminal sends the message of "terminating the service of this time" to the server, and then disconnects the wireless connection with the supplier;

C: After receiving the message of "terminating service of this time" sent from the demander terminal, the server sends the acknowledgement message of "terminating service of this time" to the currently-serving supplier terminal; D: After receiving the acknowledgement message of "terminating service of this time" from the server, the supplier terminal disconnects wireless connection with the demander, and then sends the acknowledgement message of "terminating service of this time" to the server;

Or, (5.3) When the supplier role of the user is in an activated state, the user may deactivates the supplier role at any time; after receiving the request to "deactivate the supplier role", the networking transfer service terminal stops judging whether a wireless hotspot module of the user terminal has a condition for activating the supplier wireless hotspot; and executes the following steps:

(5.3.1) When the service terminal is, as the supplier terminal, providing the networking transfer service, A: The supplier terminal stops sending the charging recording list to the demander terminal and the networking transfer server, and the routing control module of the supplier terminal employs an IP or port filtering function and permits and only permits a communication message between the supplier terminal and the networking transfer server; the supplier terminal sends the request message of "terminating service of this time" respectively to the demander terminal and the networking transfer server; if the supplier terminal has real-time flicker display of the current charging information on the human-machine interface, the real-time flicker display of the current charging information will be paused immediately;

B: After receiving the request message of "terminating service of this time" from the supplier terminal, the demander terminal immediately pauses real-time flicker display of the current charging information, and displays on the human-machine interface a prompt "service is stopped due to the supplier"; the demander terminal sends the message of "terminating the service of this time" to the server, and then disconnects the wireless connection with the supplier;

C: After receiving the message of "terminating service of this time" sent from the demander terminal, the server sends the acknowledgement message of "terminating service of this time" to the currently-serving supplier terminal;

D: After receiving the acknowledgement message of "terminating service of this time" from the server, the supplier terminal disconnects wireless connection with the demander, closes the wireless hotspot module of the supply terminal, and then sends the acknowledgement message of "terminating service of this time" to the server;

(5.3.2) When the service terminal is not providing the networking transfer service, A: If the wireless hotspot module of the service terminal, as the supplier wireless hotspot of the present service, is in an activated state, it will be closed;

Or, (5.4) The networking transfer server extracts supplier service unit price information from a "supplier SSID" codeword of the supplier user, and checks it with the supplier service unit price information in the user's "supplier information field"; after the networking transfer server receives the current charging recording list respectively from the supplier terminal and the demander terminal, it checks the charging recording list information received from the supplier and the demander; and the networking transfer server judges credit conditions of the current service according to the demander's credit conditions and the charging information of the current service;

(5.4.1) If check results in the above aspects all show agreement and the credit conditions of the current service are acceptable, the charging information will be stored and acknowledged;

(5.4.2) If check results in the above aspects show disagreement in any one aspect or the credit conditions of the current service are not acceptable, the charging information will be stored and the following steps will be executed:

A: The server sends a request message of "terminating current service due to charging problem" to the demander terminal;

B: After receiving the request message of "terminating current service due to charging problem" from the server, the demander terminal immediately pauses real-time flicker display of the current charging information, and prompts the user of the following via the human-machine interface: terminate the current service due to charging problem; meanwhile, the demander terminal stops sending the charging recording list to the networking transfer server, and sends an acknowledgement message of "terminating service of this time" to the server; and then disconnects wireless connection with the supplier;

C: After receiving the acknowledgement message of "terminating service of this time" reported by the demander, the server sends the message of "terminating service of this time" to the currently-serving supplier terminal;

D: After receiving the message of "terminating service of this time" from the server, the supplier terminal immediately stops sending the charging recording list to the demander terminal and the server, disconnects wireless connection with the demander, and then sends the acknowledge message of "terminating service of this time" to the server; if the supplier terminal has real-time flicker display of the current charging information on the human-machine interface, the real-time flicker display of the current charging information will be paused immediately;

Said abnormal termination in said step (5) comprises:

(5.5) Other abnormal terminations caused by communication interruption a. abnormal interruption of wireless connection between the demander and supplier, b. abnormal interruption of a communication link between the supplier and the Internet, c. interruption of wireless connection caused by supplier terminal abnormity or halt, d. interruption of wireless connection caused by demander terminal abnormity or halt;

The above-mentioned other abnormal terminal occasions caused by communication interruption will cause message communication abnormity between the supplier terminal and the demander terminal;

When the networking transfer service terminal detects communication abnormity, no new charging information will be output any more; and if the networking transfer service terminal has real-time flicker display of the current charging information on the human-machine interface, the real-time flicker display of the current charging information will be paused immediately, and meanwhile a prompt that "service is interrupted due to communication abnormity" is displayed to the user on the human-machine interface.

In the method of implementing the networking transfer service system, the message communication abnormity comprises: one party fails to receive a reply message or acknowledgement message from the other party within a range set by a timer.

Said step (3.5) may further comprise:

enabling the supplier user to select a service manner:

The supplier terminal, via a human-machine interface, displays the aforesaid demander user information which has already passed authentication, and related information may contain the following information of the demander: the demander user name;

The supplier user may, via the human-machine interface, make the following selection with respect to the demander's demands for the networking transfer service: option A: providing charging service; option B: free service; option C: refusing to provide service; option D: timer default selection;

Wherein a technical solution of option D, namely, timer default selection, is: the terminal human-machine interface displays countdown from N seconds, wherein N may be a certain time length in a range from 2 seconds to 20 seconds, for example, N=3 seconds, or 5 seconds, or 8 seconds or 10 seconds; when the countdown reaches 0 second, if the user still does not make any selection from A or B or C, the supplier terminal thinks by default that selection made by the user is the aforesaid option A, namely, providing the charging service;

If the supplier user selects A:

The routing control module of the supplier terminal permits all Internet transceiving messages of the demander, and at the same time, the charging module of the supplier terminal begins to execute the charging operation;

If the supplier user selects B:

The routing control module of the supplier terminal permits all Internet transceiving messages of the demander; the supplier terminal sends a notification message that "service of this time is free" respectively to the demander terminal and the networking transfer server;

If the supplier user selects C:

The supplier refuses to provide networking transfer service to the demander; a specific flow is as follows:

The supplier terminal sends a request message to "terminate service of this time" respectively to the demander terminal and the server;

After receiving the request to "terminate service of this time" sent from the supplier terminal, the demander terminal sends a message of "terminating service of this time" to the server, and then disconnects wireless connection with the supplier;

After receiving the message of "terminating service of this time" sent from the demander terminal, the server sends an acknowledge message of "terminating service of this time" to the currently-serving supplier terminal;

After receiving the acknowledge message of "terminating service of this time" sent from the server, the supplier terminal disconnects connection with the demander and sends the acknowledge message of "terminating service of this time" to the server.

The method of implementing the networking transfer service system further comprises an encrypting step in which the supplier terminal, the demander terminal, the networking transfer server, and all message tranceived between the three all make application layer encryption for message content.

In the method of implementing the networking transfer service system, the information display or information input function of the human-machine interface of the user terminal may further be implemented by the third party equipment using for example a WEB webpage or software client to access the user terminal in a network manner.

A networking transfer service system, comprising a demander terminal, a supplier terminal and a networking transfer server; wherein:

The demander terminal comprises a networking transfer service demander management module, a human-machine interface, and a WLAN;

The supplier terminal comprises a networking transfer service supplier management module, a charging module for completing the charging of the networking transfer service, a supplier information field storage space for completing storage of supplier information, a routing control module which employs an IP and port filtering function and is configured to execute allow operation or forbid operation for a communication message between a specific IP source and IP target; a human-machine interface through which the user may interact with the terminal; a wireless hotspot module; and an Internet connection module; wherein the WLAN module of the demander terminal is wirelessly connected with the wireless hotspot module of the supplier terminal and interacts with it; the routing control module controls connection between the wireless hotspot module and the Internet connection module; the supplier terminal may be connected to the Internet and the networking transfer server through the Internet connection module.

In the networking transfer service system, the human-machine interface of the user terminal may further be implemented by the third party equipment using for example a WEB webpage or software client to access a data interface provide by the user terminal in a network manner.

The networking transfer service system can complete the above-mentioned method for implementing networking transfer service system.

Technical effects of the present invention are as follows: The user may share his Internet-connecting capacity or its traffic quantity he does not use very conveniently with users who needs to access to the Internet or whose traffic quantity is insufficient on a system, and gain related benefits through this sharing. The system platform provides a networking transfer service system through which the user can perform network transfer, and particularly implement display of real-time traffic status and consumed traffic quantity and timely termination of the networking transfer. This achieves organic unification of the networking transfer activity with traffic measurement and charging; by means of flicker display of real-time traffic during the networking transfer and bidirectional authentication during the networking transfer, transparent charging may be implemented, and meanwhile, loss that might be caused to the user during use may be effectively controlled in the case of learning expenditure in real time during networking activity.

Furthermore, since information that "service unit price of the networking transfer service provided by the supplier user" is input into the "supplier SSID" codeword, the demander user terminal, by scanning nearby wireless hotspots, may find the networking transfer service supplier wireless hotspot through search and directly master the supplier user's service unit price without an extra network interaction procedure. This makes the method for implementing the networking transfer service system more concise and efficient so that the demander can find the supplier very quickly.

BRIEF DESCRIPTION OF DRAWINGS

FIG. 3 is a flow chart of initial setting of supplier information according to the present invention.

FIG. 4 is a flow chart of supplier role activation according to the present invention.

FIG. 11 is a flow chart of selecting a supplier according to the present invention.

FIG. 12 is a flow chart of logging in the supplier wireless hotspot according to the present invention.

FIG. 17 is a flow chart of normal termination of the networking transfer service: the supplier user terminating service of this time, according to the present invention.

FIG. 20 is a flow chart of other abnormal termination flows of service caused by communication interruption according to the present invention.

DETAILED DESCRIPTION OF PREFERRED EMBODIMENTS

Figure 1:
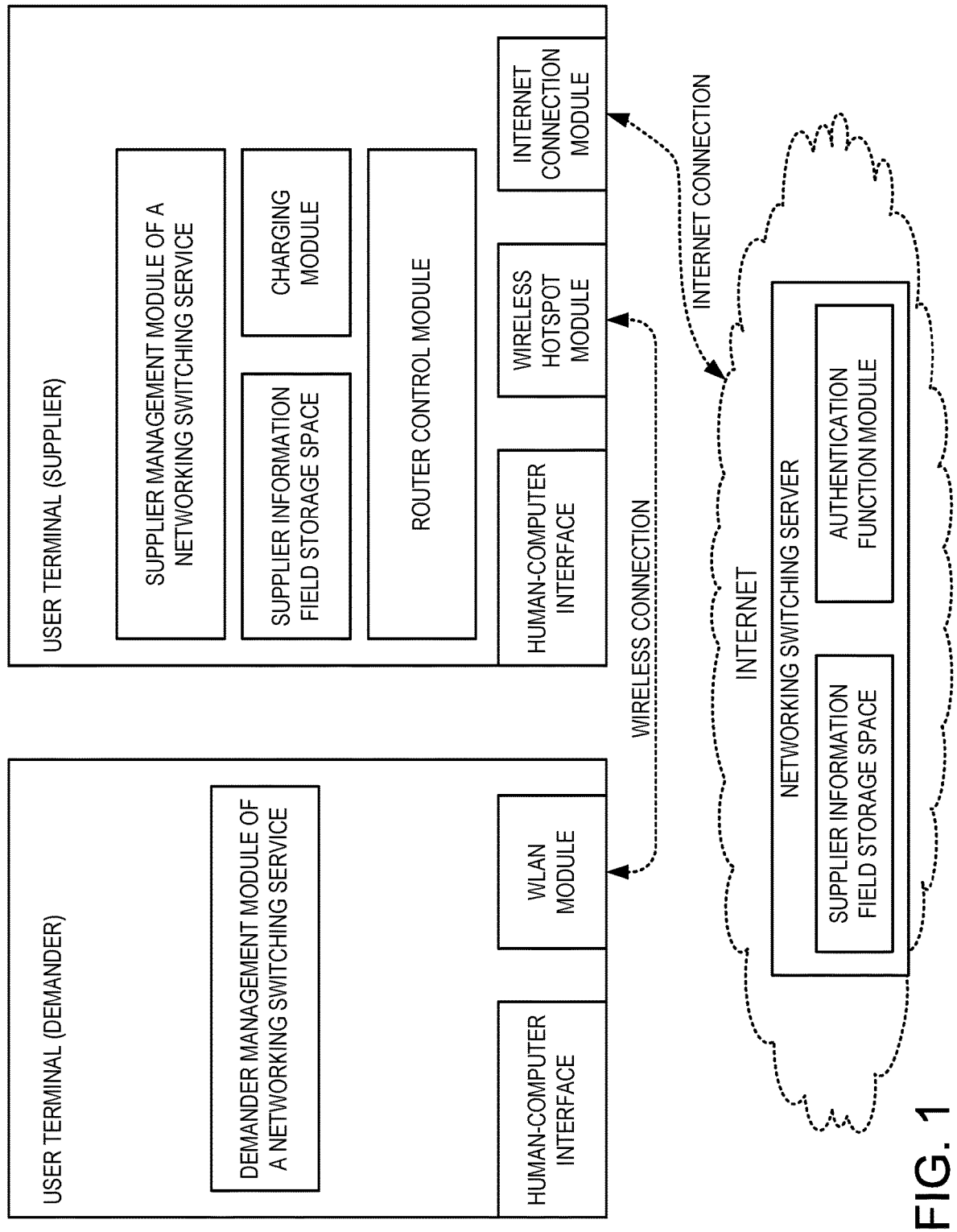
FIG. 1 is a framework diagram of a system according to the present invention.

As shown in FIG. 1, a specific embodiment of a system according to the present invention is as follows:

A system for implementing networking transfer service, comprising a demander user terminal, a supplier user terminal and a networking transfer server; wherein: The demander user terminal comprises: a networking transfer service demander management module, a human-machine interface, and a WLAN;

The supplier user terminal comprises: a networking transfer service supplier management module, a charging module for completing the charging of the networking transfer service, a supplier information field storage space for storing supplier information, a routing control module which employs an IP and port filtering function and is configured to execute allow or forbid operation for a communication message between a specific IP source and IP target; a human-machine interface through which the user may interact with the terminal; a wireless hotspot module; and an Internet connection module; wherein the WLAN module of the demander terminal is wirelessly connected with the wireless hotspot module of the supplier terminal and interacts with it; the routing control module controls connection between the wireless hotspot module and the Internet connection module; the supplier terminal may be connected to the Internet and the networking transfer server through the Internet connection module.

Wherein the human-machine interface of the user terminal may further be implemented by the third party equipment using for example a WEB webpage or application client to access a data interface provided by the user terminal in a network manner.

A specific embodiment of the method according to the present invention may be illustrated from perspective of the supplier and demander, including the flow of the supplier providing the networking transfer service as shown in FIGS. 2-8, and the flow of the demander of acquiring the networking transfer service as shown in FIGS. 9-20.

Figure 2:
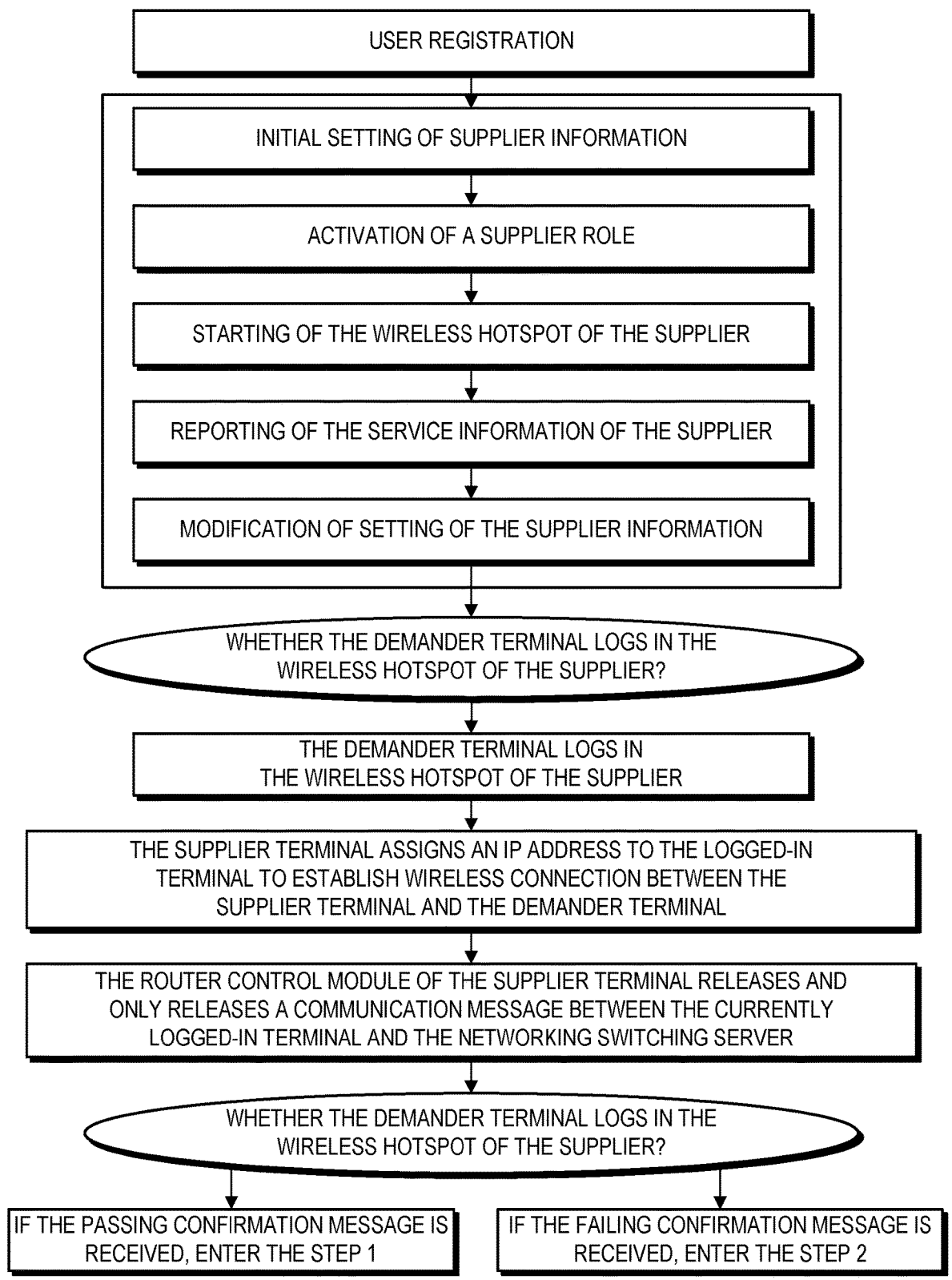
FIG. 2 is a flow chart of a supplier providing networking transfer service according to a method of the present invention.
Figure 2A:
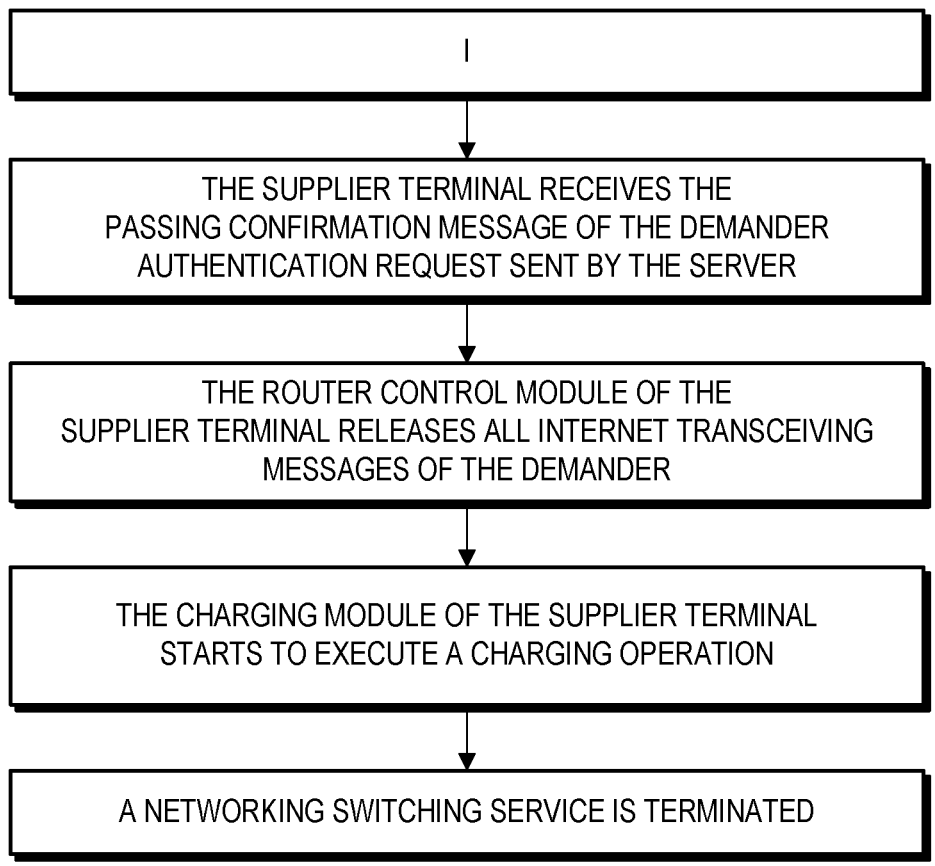
FIG. 2(a) is a flow chart after an authentication request of FIG. 1 of the present invention has passed.

The method specifically comprises the following steps:

As shown in FIG. 2, FIGS. 2(a) and 2 (b), there is provided the flow of the supplier providing the networking transfer service:

(1) user registration;

(2) initial setting of supplier information, supplier role activation and supplier wireless hotspot activation, supplier service information reporting, and supplier information setting alteration;

(3) judging whether there is a terminal logging in the supplier wireless hotspot;

(4) if there is a terminal logging in the supplier wireless hotspot, the supplier terminal allocates a private network IP address to the login terminal and establishes wireless connection with the terminal;

(5) the routing control module of the supplier terminal permits and only permits a communication message between the login terminal and the networking transfer server;

(6) judge whether an acknowledgement message which is sent from the server and about pass or no pass of a demander authentication request has been received?

Figure 2B:
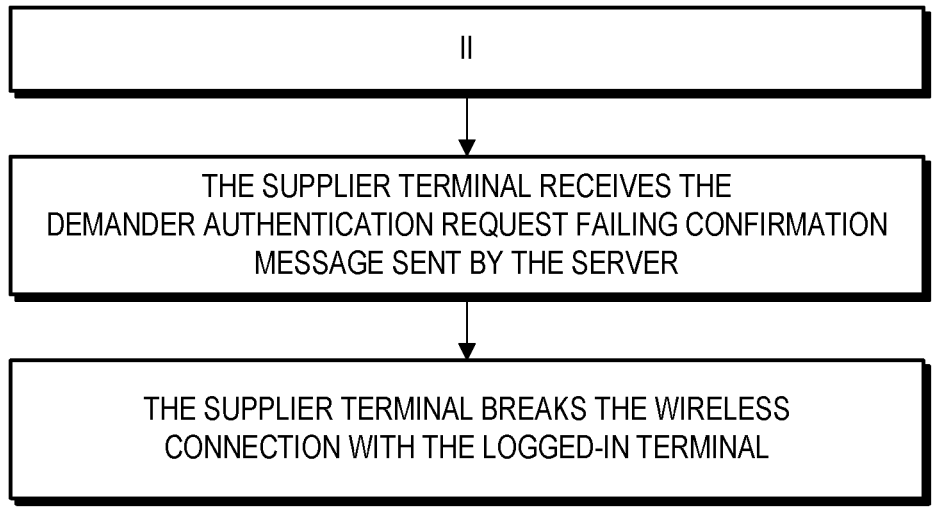
FIG. 2(b) is a flow chart after an authentication request of FIG. 1 of the present invention has not passed.

(7) if the acknowledge message about pass has been received, the flow proceeds to (1) as shown in FIG. 2(a); if the acknowledgement message about no pass has been received, the flow proceeds to (2) as shown in FIG. 2(b);

As shown in FIG. 2(a), the flow proceeds to (1): the supplier terminal receives an acknowledgement message which is sent from the server and which indicates that the demander authentication request has passed, and then the routing control module of the supplier terminal permits all Internet transceiving messages of the demander; the supplier terminal charging module begins to execute the charging operation; terminating the networking transfer service.

As shown in FIG. 2(b), the flow proceeds to (2): the supplier terminal receives an acknowledgement message which is sent from the server and which indicates that the demander authentication request has not passed; the supplier terminal disconnects the wireless connection with the login terminal.

Figure 5:
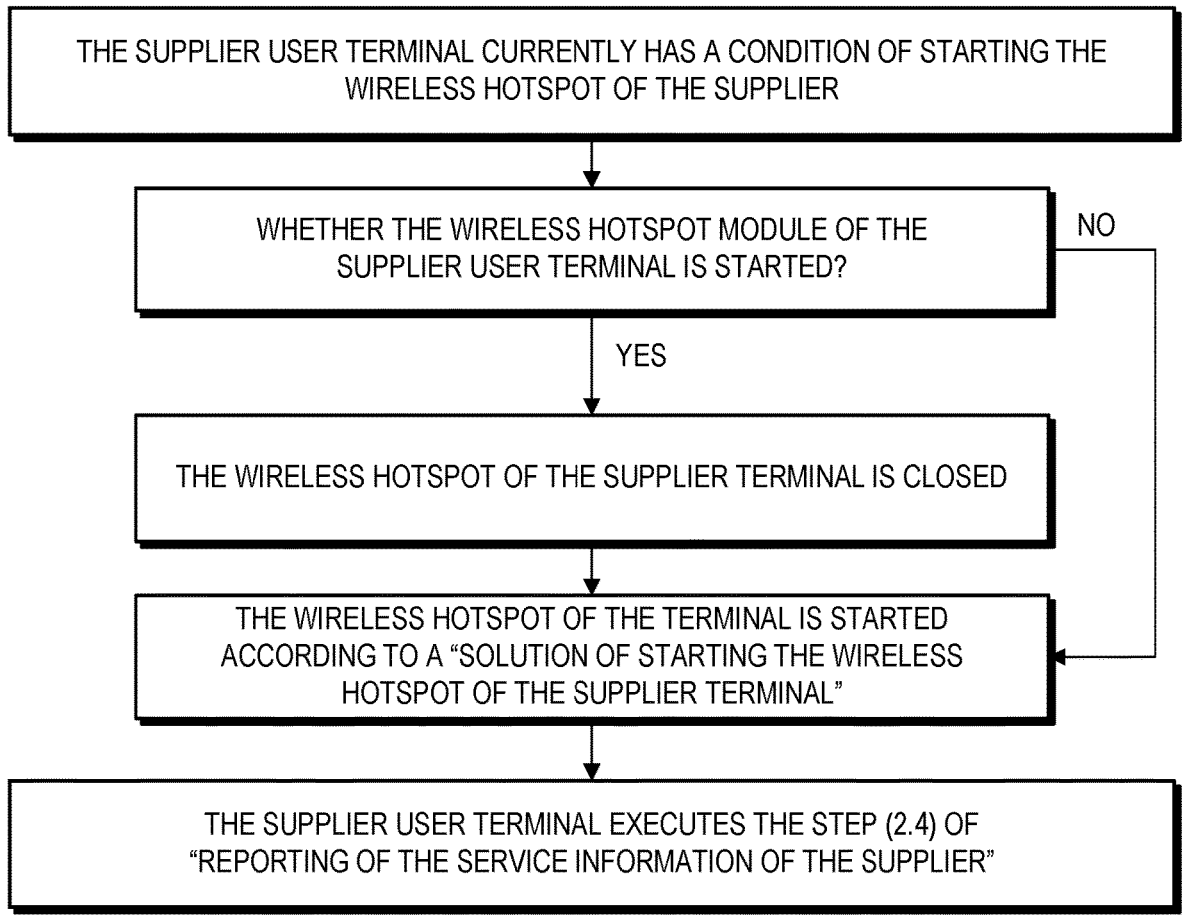
FIG. 5 is a flow chart of supplier wireless hotspot activation according to the present invention.
Figure 6:
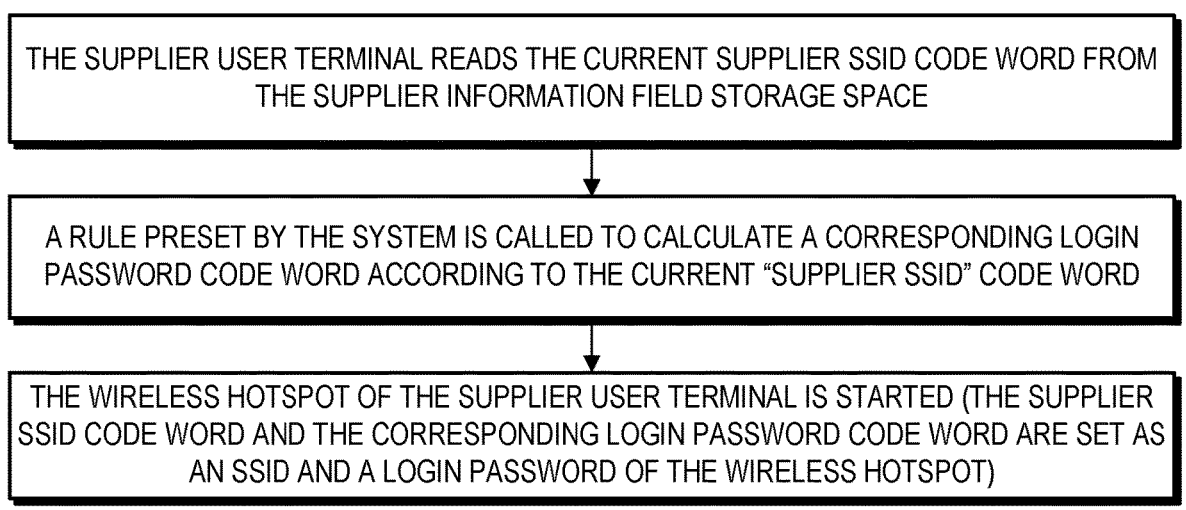
FIG. 6 is a schematic diagram of a scheme of supplier wireless hotspot activation according to the present invention.
Figure 7:
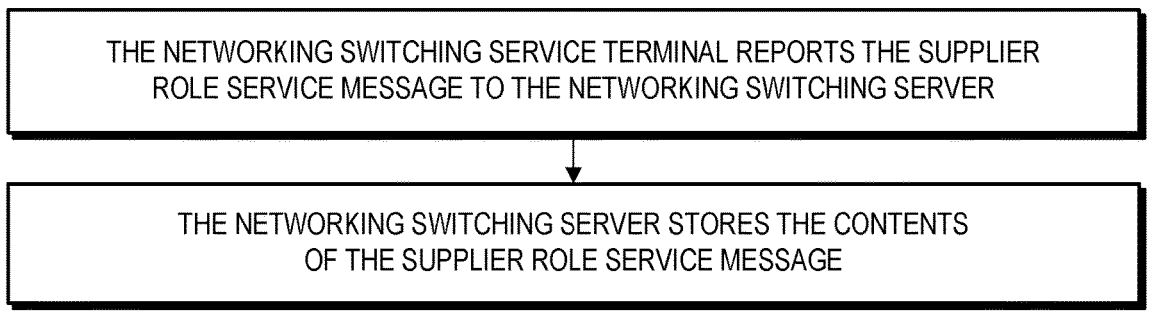
FIG. 7 is a flow chart of supplier service information reporting according to the present invention.

The above step (2) is further decomposed as follows:

a supplier information initial setting flow as shown in FIG. 3, wherein, (1) After the user completes registration, the networking transfer server opens a "supplier information field" storage space on the server side for the user, and endows a default value to each information field in the "supplier information field" storage space except for "supplier SSID" codeword, wherein it contains a service unit price of the networking transfer service provided by the user as the supplier to other demander users, including traffic unit price or time length unit price;

(2) The networking transfer server sends "supplier information initial setting message" to the user terminal, and content of the message contains default values in the "supplier information field" except for "supplier SSID" codeword;

(3) After the user terminal receives "supplier information initial setting message", the message content is stored in the "supplier information field" storage space;

(4) According to a service supplier feature code as appointed by the whole system, the user's feature identification code and "service unit price of the networking transfer service provided by the user" in the "supplier information field", the user terminal, according to a supplier SSID codeword encoding rule preset in the system, generates a codeword of the supplier wireless hotspot service identification, namely, "supplier SSID" codeword, including information of the service supplier feature code as appointed by the whole system, the user's feature identification code information and information of "service unit price of the networking transfer service provided by the user";

(5) The user terminal stores the newly-generated "supplier SSID" codeword in the "supplier information field" storage space of the present terminal, and reports "supplier role service message" to the networking transfer server, the message may include items of information content in the user "supplier information field", including the newly-generated "supplier SSID" codeword;

(6) The networking transfer server stores the "supplier role service message" sent from the user terminal in the "supplier information field" storage space for the user on the server side;

As shown in FIG. 4, there is a supplier user role activation flow, wherein, (1) The user activates the supplier role;

(2) According to a current state of the user terminal and a value of the "supplier information field", the user terminal judges whether a wireless hotspot module of the user terminal has a condition for activating the supplier wireless hotspot;

As shown in FIG. 5, there is a supplier wireless hotspot activation flow, wherein, (1) The networking transfer service terminal judges that the user terminal currently has the condition for activating the supplier wireless hotspot;

(2) Whether the wireless hotspot module of the user terminal has already been activated; if yes, the flow proceeds to (3); if no, the flow proceeds to (4);

(3) When the wireless hotspot module has already been activated, the user terminal closes the wireless hotspot;

(4) Activating the wireless hotspot according to a "supplier wireless hotspot activation scheme";

(5) The user terminal executes step (2.4) "supplier service information reporting" as shown in FIG. 7;

As shown in FIG. 6, there is provided a supplier wireless hotspot activation scheme, wherein, (1) The user terminal reads the current "supplier SSID" codeword from the "supplier information field" storage space;

(2) Invoke a supplier SSID codeword-login password codeword mapping rule preset in the system, and calculate a corresponding login password codeword according to the current "supplier SSID" codeword;

(3) Activate the wireless hotspot of the terminal (set the aforesaid "supplier SSID" codeword and the corresponding login password codeword as the SSID and login password of the wireless hotspot of the present terminal);

FIG. 7 shows a supplier service information reporting flow, wherein, (1) The present networking transfer service user terminal reports a supplier role service message to the networking transfer server;

(2) The networking transfer server stores content in the supplier role service message in the "supplier information field" storage space for the user on the server side.

Figure 8:
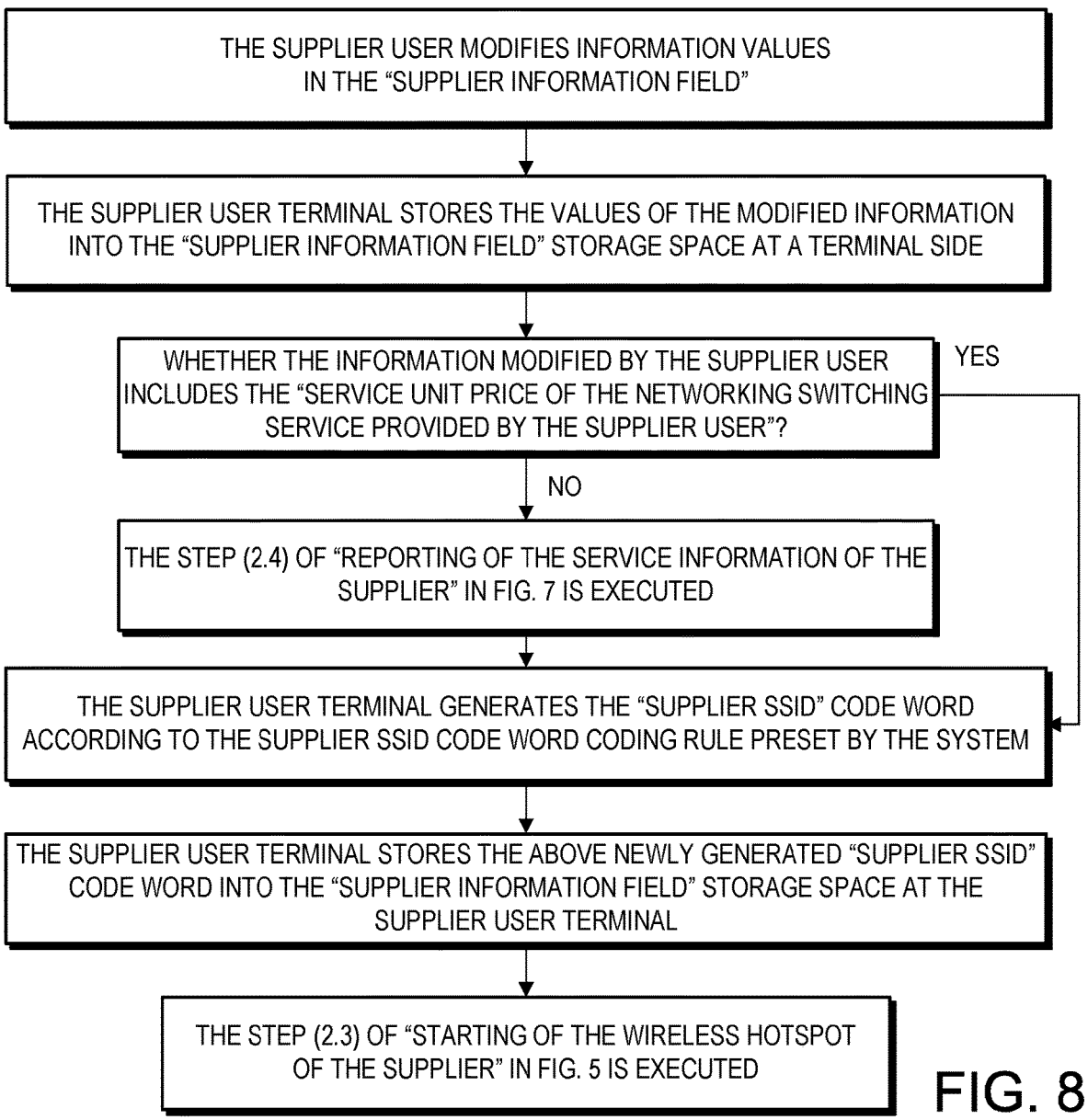
FIG. 8 is a flow chart of supplier information setting alteration according to the present invention.

FIG. 8 shows a supplier information setting alteration flow, wherein, (1) The user alters an information value in the "supplier information field";

(2) The user terminal stores the altered information value in the "supplier information field" storage space on the terminal side;

(3) Whether the user-altered information includes "service unit price of the networking transfer service provided by the user"; if yes, the flow proceeds to (4); if no, the flow proceeds to (5);

(4) If the user-altered information does not include the "service unit price of the networking transfer service provided by the user", execute step (2.4) "supplier service information reporting" in FIG. 7; the flow ends up;

(5) If user-altered information includes the "service unit price of the networking transfer service provided by the user", according to a service supplier feature code as appointed by the whole system, the user's feature identification code and "service unit price of the networking transfer service provided by the user" in the "supplier information field", the user terminal, according to a supplier SSID codeword encoding rule preset in the system, generates a codeword of the supplier wireless hotspot service identification, namely, "supplier SSID" codeword, including information of the service supplier feature code as appointed by the whole system, the user's feature identification code information and information of the "service unit price of the networking transfer service provided by the user";

(6) The user terminal stores the aforesaid newly-generated "supplier SSID" codeword in the "supplier information field" storage space on the terminal side;

(7) The user terminal executes the aforesaid step (2.3) "supplier wireless hotspot activation" in FIG. 6.

Figure 9:
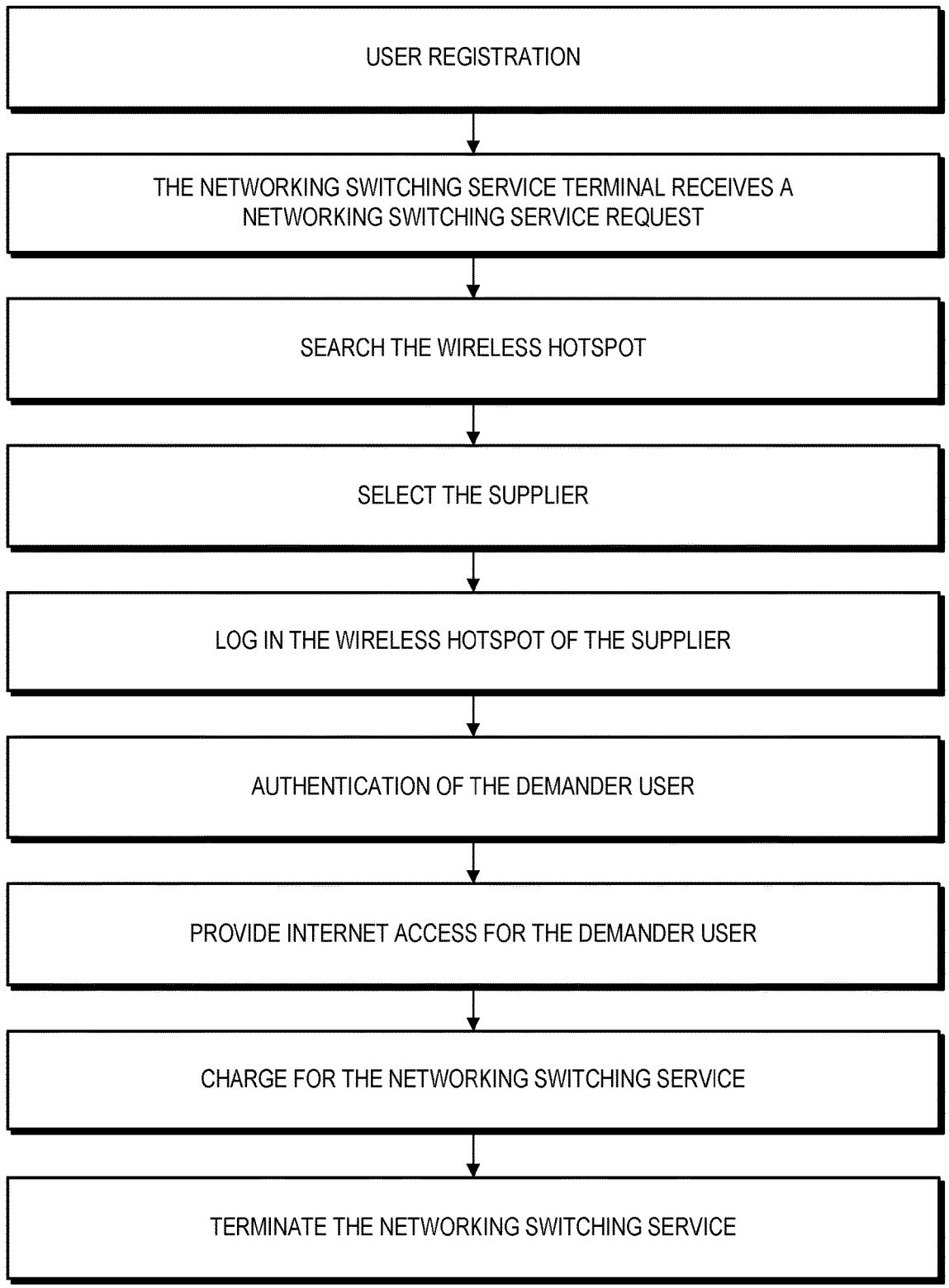
FIG. 9 is a flow chart of a demander obtaining the networking transfer service according to the present invention.

FIG. 9 shows a flow of a demander of obtaining the networking transfer service, wherein, (1) User registration;

(2) The user terminal receives a networking transfer service request;

(3) Search for a supplier wireless hotspot;

(4) Select a supplier;

(5) Log in the supplier wireless hotspot;

(6) Demander user authentication;

(7) Provide access to the Internet for the demander user;

(8) Charge the networking transfer service;

(9) Terminate the networking transfer service.

Figure 10:
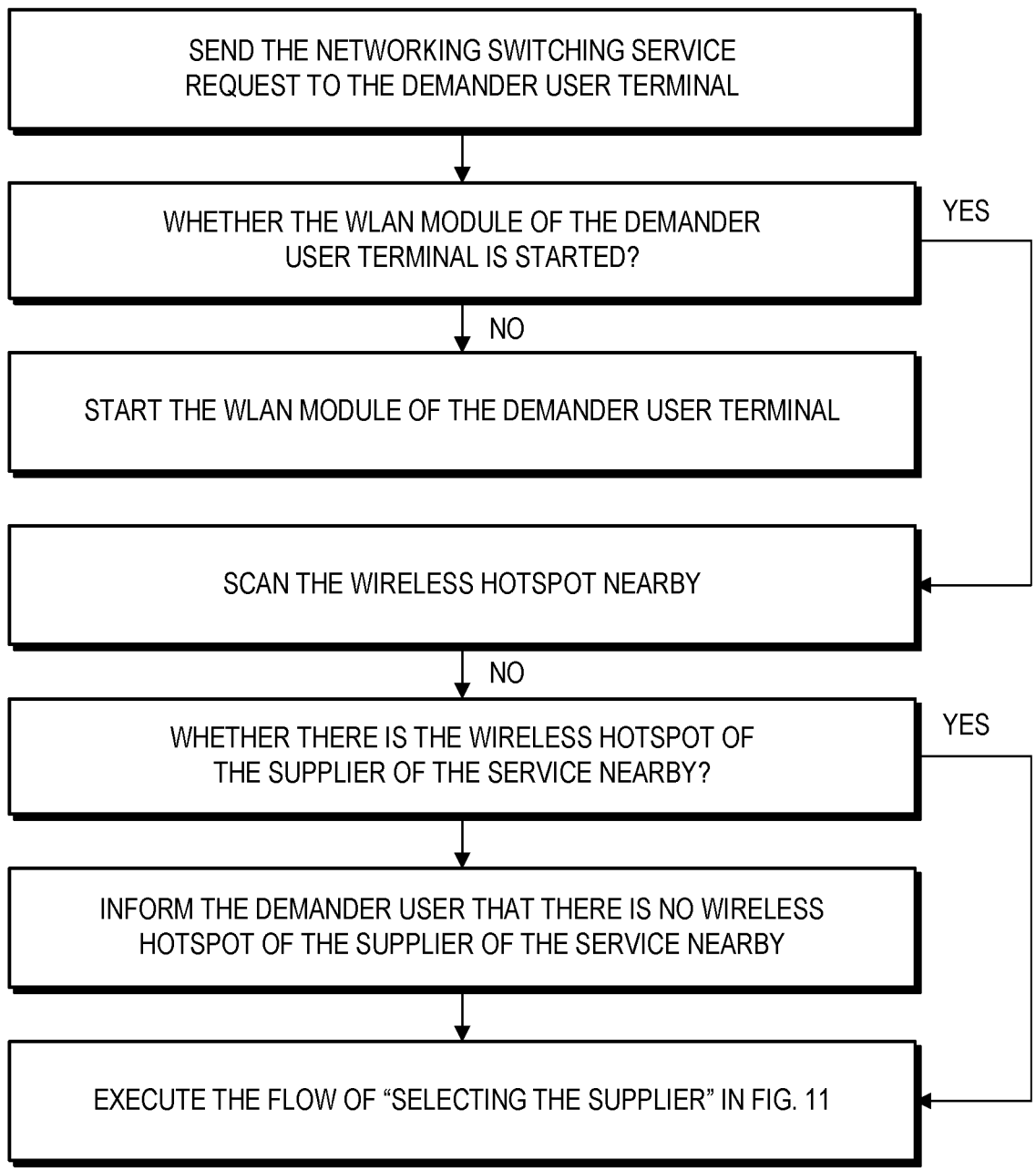
FIG. 10 is a flow chart of searching for a supplier wireless hotspot according to the present invention.

FIG. 10 shows a flow of searching for a supplier wireless hotspot, wherein, (1) Send a networking transfer service request to a networking transfer service demander management module of the user terminal;

(2) Whether a WLAN module of the user terminal has already been activated? If yes, the flow proceeds to (3); if no, the flow proceeds to (4);

(3) Activate the WLAN module of the user terminal;

(4) Scan nearby wireless hotspots;

(5) Whether there is a supplier wireless hotspot of the present service nearby? If yes, the flow proceeds to (6); if no, the flow proceeds to (7);

(6) Notify the user that there is no supplier wireless hotspot of the present service nearby; the flow ends up.

(7) Execute a flow of "selecting the supplier" as shown in FIG. 11.

Figure 13:
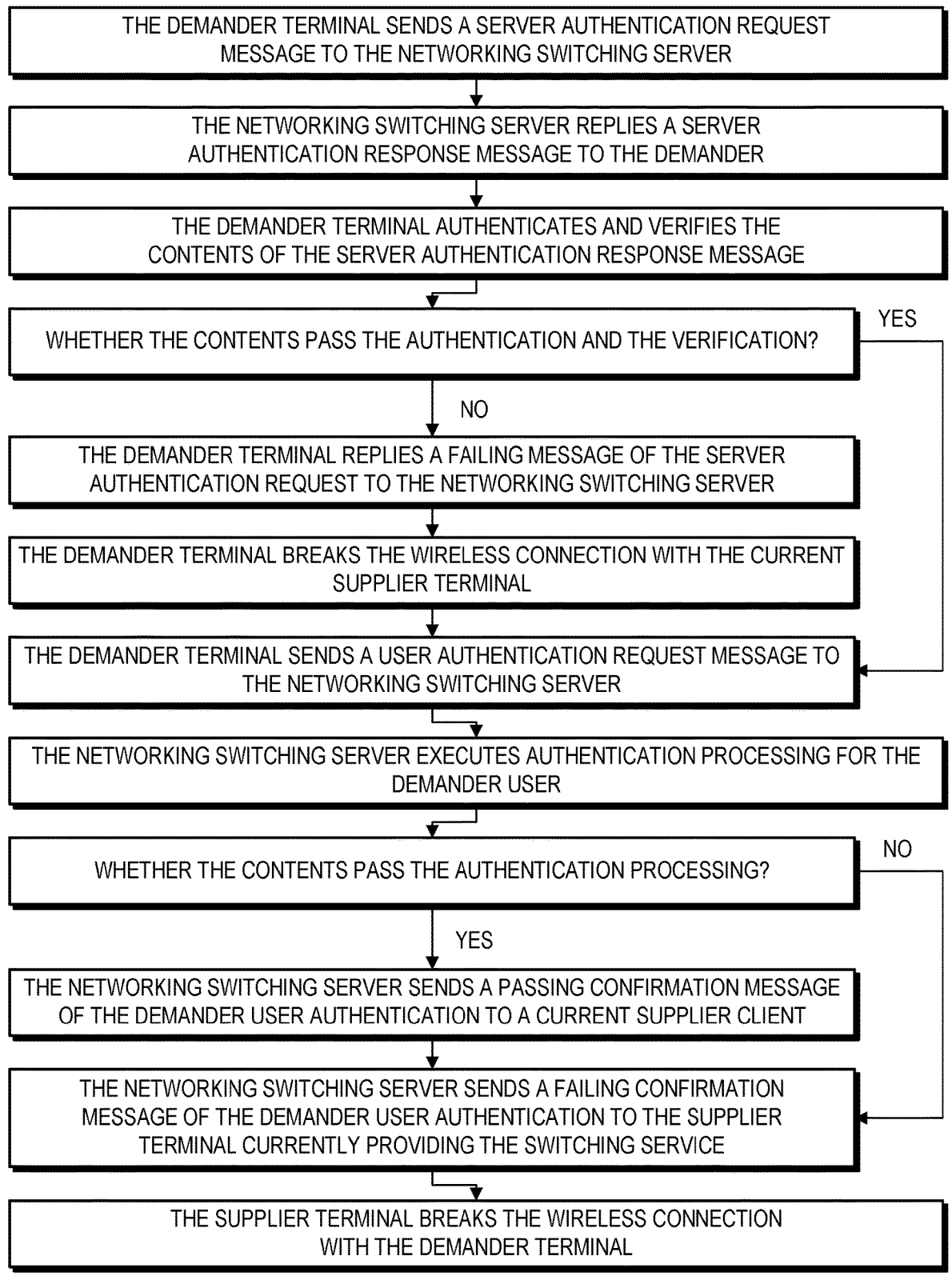
FIG. 13 is a flow chart of a demander user authentication according to the present invention.

FIG. 11 shows a flow of "selecting the supplier", wherein (1) The demander terminal extracts supplier service unit price information from the codeword of the searched supplier wireless hotspot SSID, and forms a copy of currently-available supplier listing;

(2) The demander terminal displays on the human-machine interface information in the currently-available supplier listing;

(3) The user selects, via the human-machine interface, a supplier he likes from the currently-available supplier listing;

FIG. 12 shows a flow of logging in the supplier wireless hotspot, wherein, (1) The demander terminal invokes a supplier SSID codeword-login password codeword mapping rule preset in the system, and calculates a corresponding password codeword according to the user-selected supplier wireless hotspot SSID codeword;

(2) The demander terminal uses the currently-calculated password codeword to log in the aforesaid selected supplier wireless hotspot;

(3) The supplier terminal allocates a private network IP address to the login terminal to establish wireless connection;

(4) The routing control module of the supplier terminal permits and only permits a communication message between the current login terminal and the networking transfer server;

(5) The demander terminal activates the demander user authentication; FIG. 13 shows a demander user authentication flow, wherein (1) The demander terminal sends a server authentication request message to the networking transfer server;

(2) An authentication function module of the networking transfer server executes authentication processing and replies a server authentication response message to the demander;

(3) The demander terminal checks content of the server authentication response message;

(4) Whether the check has passed? If no, the flow proceeds to (5); if yes, the flow proceeds to (7);

(5) If the check has not passed, the demander terminal returns to the networking transfer server a message to the effect that the server authentication request has not passed;

(6) The demander terminal disconnects wireless connection with the current supplier terminal, and exhibits a corresponding prompt to the demander user via the human-machine interface; the flow ends up.

(7) If the check has passed, the demander terminal sends a user authentication request message to the networking transfer server;

(8) The authentication function module of the networking transfer server executes authentication processing: specifically, confirms the user's identification according to related information in the user authentication request message, checks the user's credit conditions, and thereby judges whether to permit passage of the user authentication request;

(9) Whether the user authentication request has passed? If yes, the flow proceeds to (10); if no, the flow proceeds to (11);

(10) If the user authentication request has passed, the server sends an acknowledge message to the effect that the demander user authentication has passed to the demander user terminal and the supplier terminal currently providing the transfer service; the flow ends up.

(11) If the user authentication request has not passed, the networking transfer server returns to the demander terminal a message to the effect that the user authentication request has not passed; then, the server sends to the supplier terminal currently providing the transfer service an acknowledgement message to the effect that the demander user authentication request has not passed;

(12) After the supplier terminal receives the message that the authentication request has not passed, disconnects the wireless connection with the demander terminal.

Figure 14:
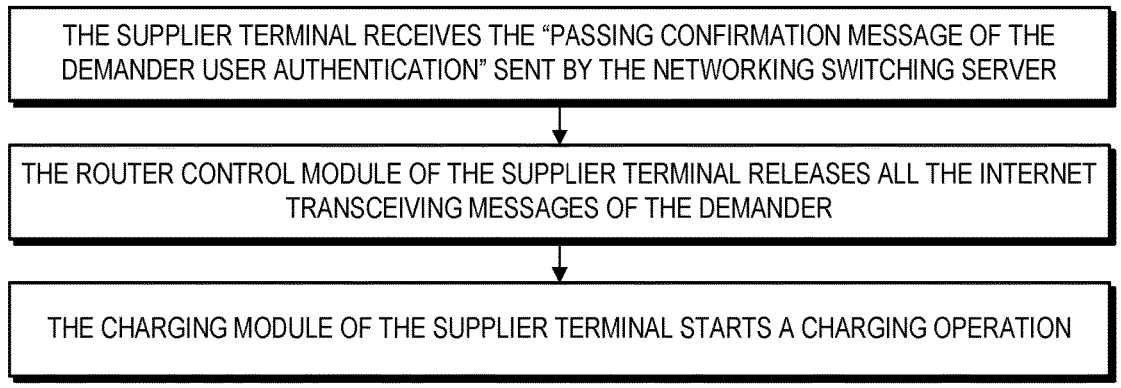
FIG. 14 is a flow chart of providing the demander user with access to the Internet after the demander authentication has passed according to the present invention.

FIG. 14 shows a flow of providing access to the Internet for the demander user after the demander authentication has passed, wherein, (1) After the supplier terminal receives the "message to the effect that the demander user authentication has passed" sent from the networking transfer server, the routing control module of the supplier terminal permits all Internet transceiving messages of the demander;

(2) A charging module of the supplier terminal activates charging operation.

Figure 15:
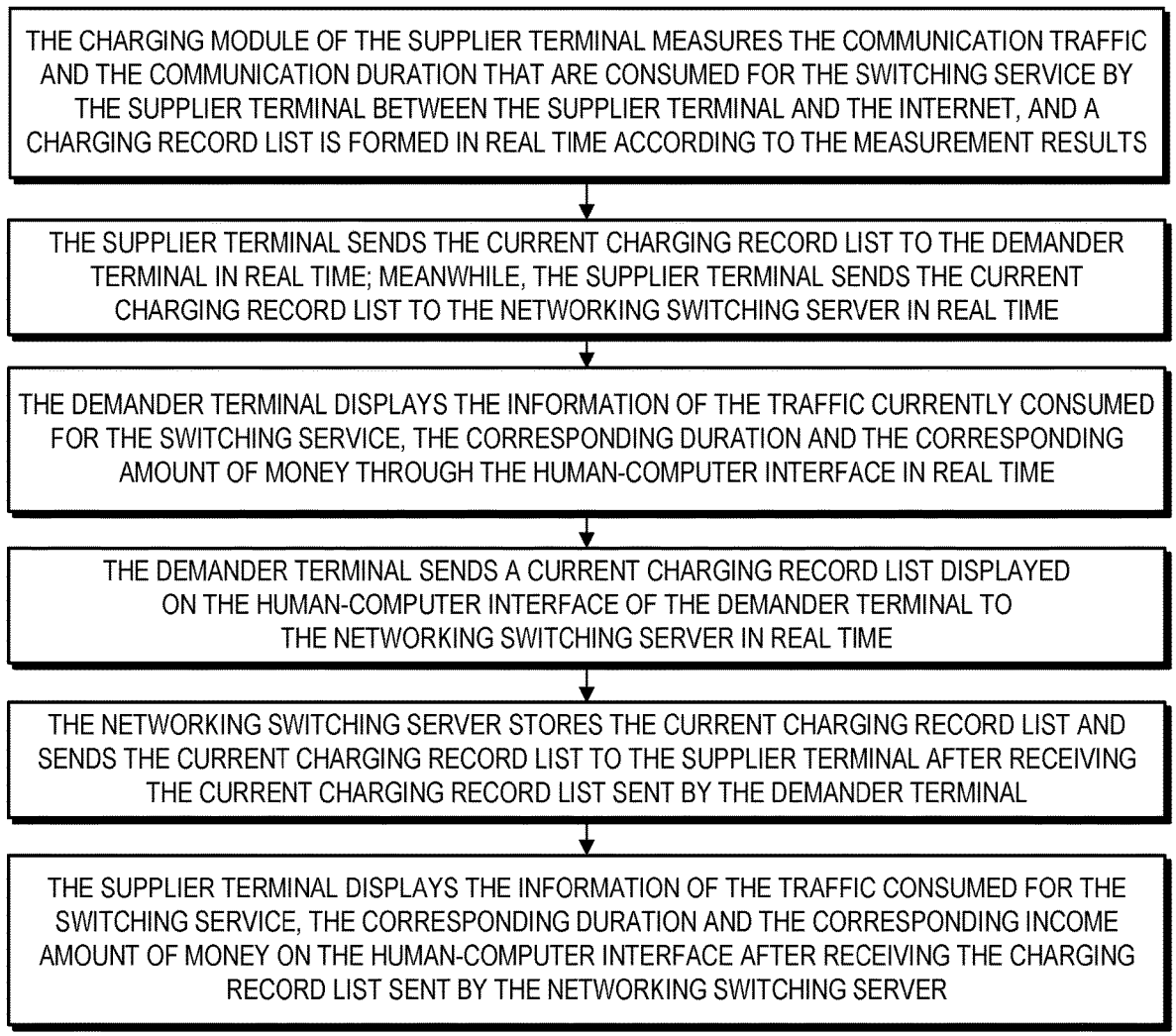
FIG. 15 is a flow chart of charging the networking transfer service according to the present invention.

FIG. 15 shows a flow of charging the networking transfer service, wherein, (1) The supplier terminal charging module measures traffic and time length of communication between the supplier terminal and the Internet as exported by the supplier terminal for the transfer service of this time;

(2) The supplier terminal sends in real time a current charging recording list to the demander terminal, and meanwhile, the supplier terminal sends in real time the charging recording list to the networking transfer server;

(3) The demander terminal displays, in real time, traffic of the transfer service of this time already consumed up to the current moment, corresponding time length and corresponding sum information via the human-machine interface;

(4) The demander terminal sends in real time to the networking transfer server the current charging recording list already displayed on the demander terminal human-machine interface;

(5) After receiving the current charging recording list sent from the demander terminal, the networking transfer server stores it and sends it to the supplier terminal;

(6) After receiving the charging recording list sent from the networking transfer server, the supplier terminal displays, on the human-machine interface, the traffic already spent by the transfer service of this time, corresponding time length and corresponding income sum information.

Figure 16:
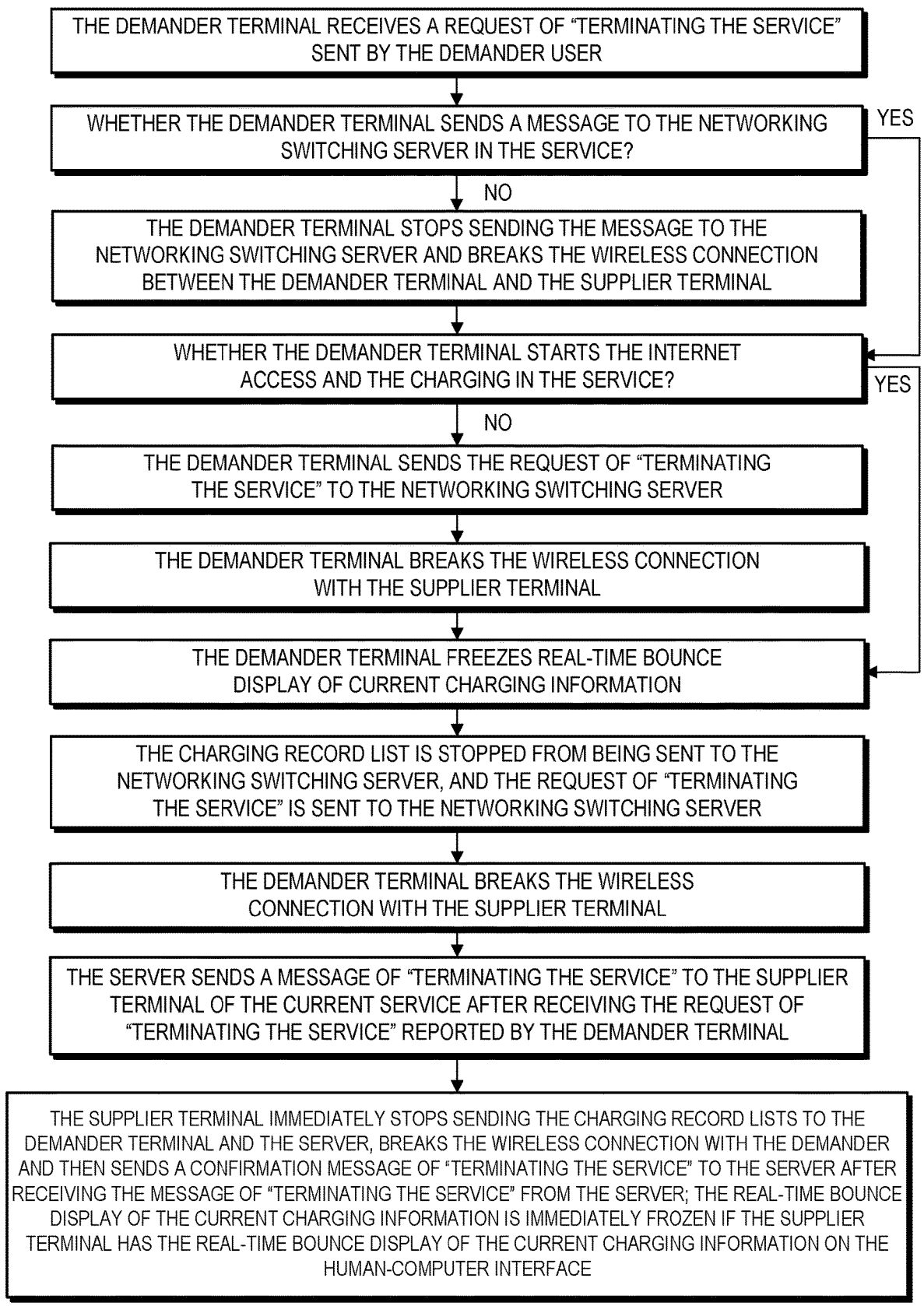
FIG. 16 is a flow chart of normal termination of the networking transfer service: the demander user terminating service of this time, according to the present invention.

FIG. 16 shows a flow of normally terminating the networking transfer service: the demander user terminates service of this time, wherein, (1) The demander terminal receives "a request to terminate service of this time" sent from the user;

(2) Whether the demander terminal has already sent a message to the networking transfer server? If no, the flow proceeds to (3); if yes, the flow proceeds to (4);

(3) The demander terminal stops sending the message to the networking transfer server, and disconnects wireless connection between the present terminal and the supplier terminal; the flow ends up.

(4) Whether the demander terminal has already begun access to the Internet and charging? If no, the flow proceeds to (5); if yes, the flow proceeds to (7);

(5) The demander terminal sends a request to "terminate the service of this time" to the networking transfer server;

(6) The demander terminal disconnects wireless connection with the supplier terminal. The flow ends up.

(7) The demander terminal pauses real-time flicker display of the current charging information;

(8) The demander terminal stops sending the charging recording list to the networking transfer server, and sends the request to "terminate the service of this time" to the networking transfer server;

(9) The demander terminal disconnects wireless connection with the supplier terminal;

(10) After receiving the request to "terminate the service of this time" reported by the demander terminal, the server sends a message of "terminating the service of this time" to the currently-serving supplier terminal;

(11) After receiving the message of "terminating the service of this time" from the server, the supplier terminal immediately stops sending the charging recording list to the demander terminal and the server, and disconnects the wireless connection with the demander, and then sends an acknowledgement message of "terminating the service of this time" to the server; if the supplier terminal has real-time flicker display of the current charging information on the human-machine interface, the real-time flicker display of the current charging information will be paused immediately; the flow ends up.

FIG. 17 shows a flow of normally terminating the networking transfer service: the supplier user terminates service of this time, wherein, (1) The supplier terminal receives the "request to terminate the service of this time" sent by the user;

(2) The supplier terminal immediately stops sending the charging recording list to the demander terminal and the networking transfer server, and the routing control module of the supplier terminal permits and only permits a communication message between the demander terminal and the networking transfer server; the supplier terminal sends a message of requesting to "terminate the service of this time" respectively to the demander client and the networking transfer server; if the supplier terminal has real-time flicker display of the current charging information on the human-machine interface, the real-time flicker display of the current charging information will be paused immediately;

(3) The demander terminal pauses real-time flicker display of the current charging information, and displays on the human-machine interface a prompt "service is stopped due to the supplier"; the demander terminal sends the message of "terminating the service of this time" to the server, and then disconnects the wireless connection with the supplier;

(4) The server sends an acknowledgement message of "terminating the service of this time" to the currently-serving supplier terminal;

(5) The supplier terminal disconnects wireless connection with demander, and sends the acknowledgement message of "terminating the service of this time" to the server.

Figure 18:
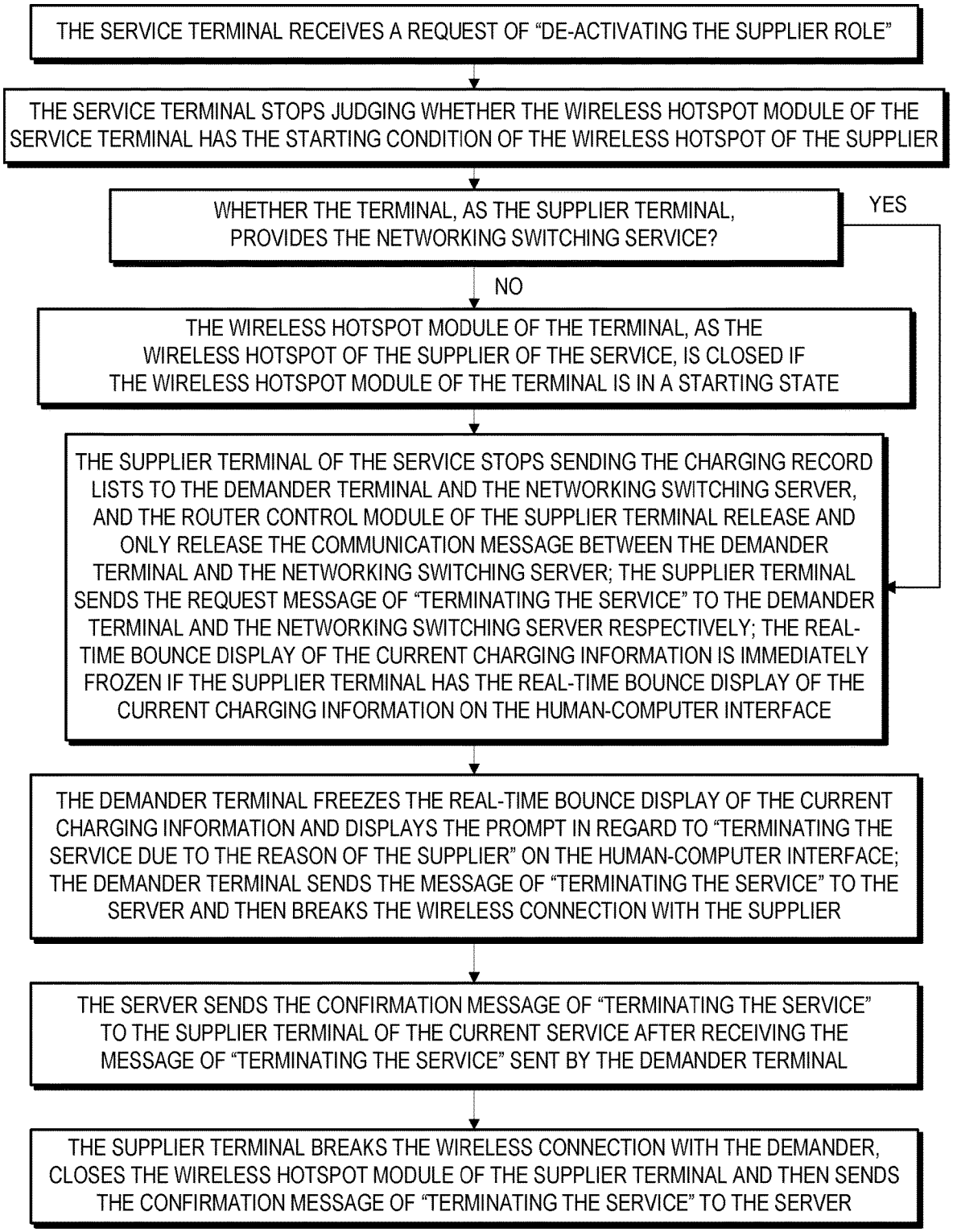
FIG. 18 is a flow chart of normal termination of the networking transfer service: the user deactivating the supplier role, according to the present invention.

FIG. 18 shows a flow of normally terminating the networking transfer service: the user deactivates a supplier role, wherein, (1) The present service terminal receives "a request to deactivate a supplier role";

(2) The service terminal stops judging whether the wireless hotspot module of the present terminal has a condition of activating the supplier wireless hotspot;

(3) Whether the present terminal is, as the supplier terminal, providing the networking transfer service? If no, the flow proceeds to (4); if yes, the flow proceeds to (5);

(4) If the wireless hotspot module of the terminal, as the supplier wireless hotspot of the present service, is in an activated state, close it; the flow ends up.

(5) The serving supplier terminal stops sending the charging recording list to the demander terminal and the networking transfer server, and the routing control module of the supplier terminal permits and only permits a communication message between the demander terminal and the networking transfer server; the supplier terminal sends a message of requesting to "terminate the service of this time" respectively to the demander terminal and the networking transfer server; if the supplier terminal has real-time flicker display of the current charging information on the human-machine interface, the real-time flicker display of the current charging information will be paused immediately;

(6) The demander terminal pauses real-time flicker display of the current charging information, and displays on the human-machine interface a prompt "service is stopped due to the supplier"; the demander terminal sends the message of "terminating the service of this time" to the server, and then disconnects the wireless connection with the supplier;

(7) After receiving the message of "terminating the service of this time" sent from the demander terminal, the server sends an acknowledgement message of "terminating the service of this time" to the currently-serving supplier terminal;

(8) After receiving the acknowledgement message of "terminating the service of this time" from the server, the supplier terminal disconnects the connection with the demander, closes the wireless hotspot module of the supplier terminal, and then sends an acknowledgement message of "terminating the service of this time" to the server.

Figure 19:
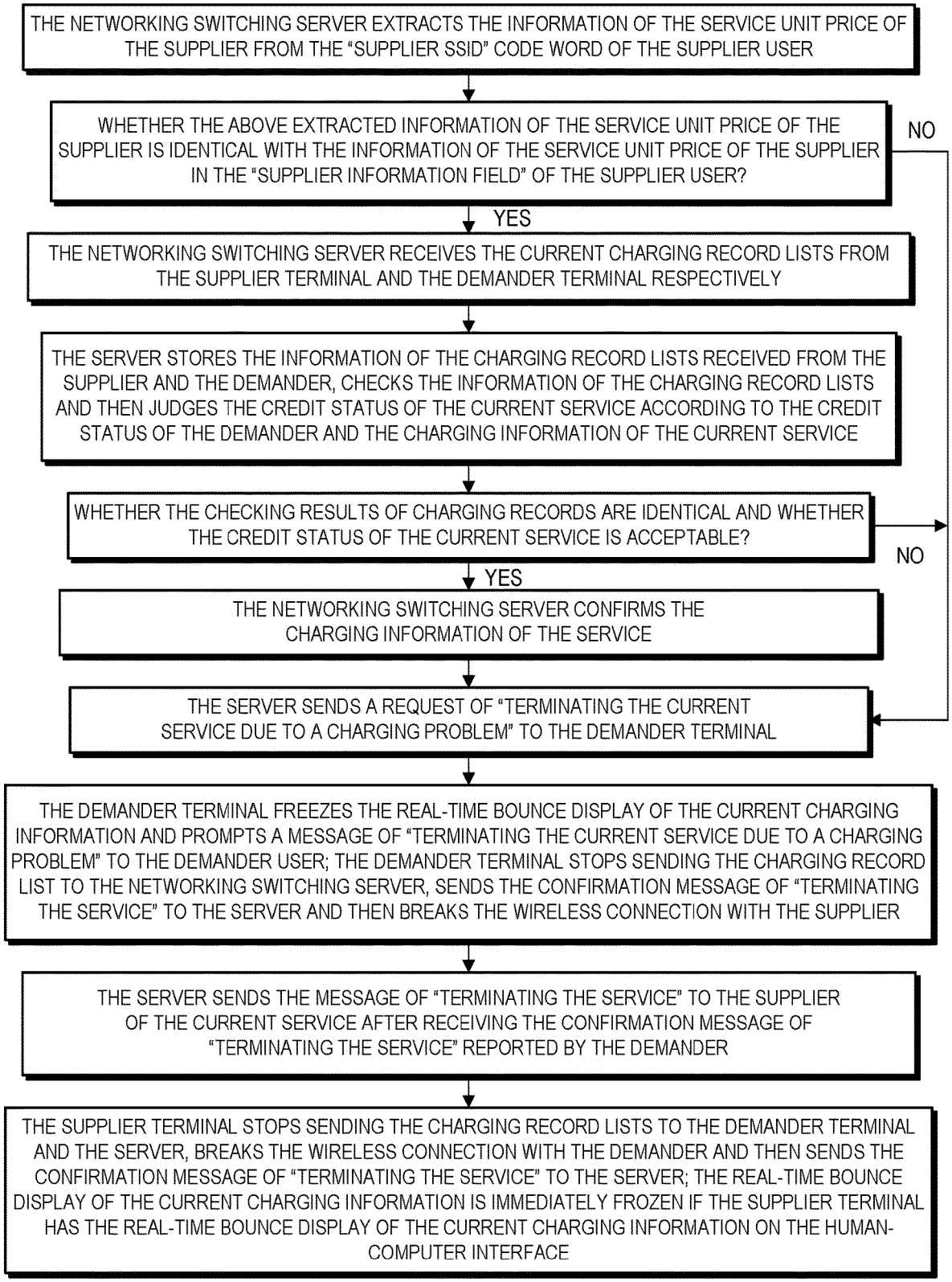
FIG. 19 is a flow chart of normal termination of the networking transfer service: the server terminating service of this time, according to the present invention.

FIG. 19 shows a flow of normally terminating the networking transfer service: the server terminates service of this time, wherein, (1) The networking transfer server extracts supplier service unit price information from the "supplier SSID" codeword of the supplier user;

(2) Whether the extracted supplier service unit price information conforms to the supplier service unit price information in the user "supplier information field"? if yes, the flow proceeds to (3); if no, the flow proceeds to (7);

(3) The networking transfer server receives the current charging recording list respectively from the supplier terminal and the demander terminal;

(4) The server stores the charging recording list information received from both the supplier and demander and verifies it, and then judges credit conditions of the current service according to the demander credit conditions and the charging information of the current service;

(5) Whether verification results of the charging records conforms or whether the credit conditions of the current service are acceptable? If both of the two cases are yes, the flow proceeds to (6); if any one of the two cases is no, the flow proceeds to (7);

(6) The networking transfer server acknowledges the charging information of the service of this time; the flow ends up;

(7) The server sends a request to "terminate current service due to charging problems" to the demander terminal;

(8) The demander terminal pauses real-time flicker display of the current charging information and, via the human-machine interface, prompts the user to "terminate current service due to charging or credit problems"; meanwhile, the demander terminal stops sending the charging recording list to the networking transfer server, and sends an acknowledgement message of "terminating the service of this time" to the server; then disconnects wireless connection with the supplier;

(9) After receiving the acknowledgment message of "terminating the service of this time" reported by the demander, the server sends a message of "terminating the service of this time" to the currently-serving supplier;

(10) The supplier terminal stops sending the charging recording list to the demander terminal and the server, and disconnects the wireless connection with the demander, and then sends an acknowledgement message of "terminating the service of this time" to the server; if the supplier terminal has real-time flicker display of the current charging information on the human-machine interface, the real-time flicker display of the current charging information will be paused immediately; the flow ends up.

FIG. 20 shows other flows of terminating the networking transfer service due to abnormal service caused by communication interruption, wherein (1) The networking transfer service terminal detects abnormity of communication (with other terminals which are carrying out communication or with the server);

(2) The terminal of the present service no longer outputs new charging information; if the terminal of the present service has real-time flicker display of the current charging information on the human-machine interface, the real-time flicker display of the current charging information will be paused immediately, and meanwhile a prompt of "causing service interruption due to communication abnormity" is displayed to the user on the human-machine interface.

In addition, the system for implementing the networking transfer service implements the object of the present invention by completing the method according to the present invention, comprising the following steps:

(1) User registration:

The user registers on the networking transfer service system, obtains a registered user name and a sole user identifier of the whole system, sets a system login password and becomes a user of networking transfer service.

The service terminal and the networking transfer system server respectively store information related to user registration.

When the present service is built in or associated with other application services, the user may share information registered for the present service with other application services, and the aforesaid registration step may be deemed as having been completed by default.

The above-mentioned registered user name may be or may not be the sole user identifier of the whole system. The above-mentioned system login password may be a password in the form of a character string, or user-specific human body features such as fingerprint, face, voice or the like.

(2) Initial setting of supplier information, supplier role activation, supplier wireless hotspot activation, supplier service information reporting, and supplier information setting alteration:

The step (2) further comprises:

(2.1) Initial setting of supplier information: upon completion of the user registration, the initial setting of supplier information may be performed; Upon completion of the user registration, the networking transfer server opens a "supplier information field" storage space for the user on the service side. The information field may be a roaming location range, a time range and a terminal power amount range where the wireless hotspot module of the user terminal may be activated as the supplier wireless hotspot, a service unit price of the networking transfer service provided by the user, and "supplier SSID" codeword;

The networking transfer server endows a default value to each information field in the "supplier information field" storage space except for "supplier SSID" codeword, wherein it contains a service unit price of the networking transfer service provided by the user as the supplier to other demander users, including traffic unit price or time length unit price;

The networking transfer server sends "supplier information initial setting message" to the user terminal, and content of the message contains default values in the "supplier information field" except for "supplier SSID" codeword;

After the user terminal receives "supplier information initial setting message", the message content is stored in the "supplier information field" storage space; according to a service supplier feature code as appointed by the whole system, the user's feature identification code and "service unit price of the networking transfer service provided by the user" in the "supplier information field", the user terminal, according to a supplier SSID codeword encoding rule preset in the system, generates a codeword of the supplier wireless hotspot service identification, namely, "supplier SSID" codeword, including information of the service supplier feature code as appointed by the whole system, the user's feature identification code information and information of "service unit price of the networking transfer service provided by the user";

The user terminal stores the newly-generated "supplier SSID" codeword in the "supplier information field" storage space, and reports "supplier role service message" to the networking transfer server, the message may include various information content in the user "supplier information field", including the newly-generated "supplier SSID" codeword;

The networking transfer server stores the "supplier role service message" sent from the user terminal in the "supplier information field" storage space for the user on the server side;

For example, the supplier SSID codeword encoding rule preset in the system may be: setting the "supplier SSID" codeword as 32 characters in three fields, wherein field 1 is used to indicate a service supplier service feature code character string appointed by the whole system and set as nine characters; field 2 is used to indicate the user's feature identification code information, specifically, indicate a MAC address of the wireless hotspot module of the user terminal, and set as 12 characters; field 3 is used to indicate service unit price information of the networking transfer service provided by the user and set as 11 characters; then the aforesaid character strings are sequentially arranged to form the "supplier SSID" codeword; for example, the character string of field 1 is "SHARELINK" and serves as the service supplier service feature code appointed by the whole system; the character string of field 2 is "74E50B9A3B98", which is the MAC address of the wireless hotspot module of the user terminal; the character sting of field 3 is "FRMB009500F", which indicates that the service unit price of the networking transfer service provided by the user is measured by traffic unit price (F), the type of currency for the unit price is Renminbi (RMB), a specific value of the unit price is 00.9500yuan (009500) every M bytes, and the final F is a filler character; the character strings of the aforesaid fields are sequentially arranged to form a character string of the "supplier SSID" codeword: SHARELINK74E50B9A3B98FRMB009500F;

As an example, the supplier SSID codeword encoding rule preset in the system may further be: setting the "supplier SSID" codeword as 32 characters in three fields; initial content of each field is as stated in the forgoing example: field 1 has the character string "SHARELINK" which serves as the service supplier service feature code appointed by the whole system; field 2 has the character string "74E50B9A3B98", which is the MAC address of the wireless hotspot module of the user terminal; field 3 has the character string "FRMB009500F", which indicates information of the service unit price of the networking transfer service provided by the user; a certain character string mapping processing method as appointed by the whole system is employed to respectively map field 2 and field 3 as a new character string; field is subjected to cyclic value-taking processing using a character value in an ordered character set {0, 1, 2, 3, 4, 5, 6, 7, 8, 9, A, B, C, D, E, F} plus 1 to become 85F61CAB4CA9, and field 3 is subjected to character leftward cyclical displacement processing to become RMB009500FF; the character strings of the aforesaid fields are sequentially arranged to form a character string of the "supplier SSID" codeword: SHARELINK85F61CAB4CA9RMB009500FF;

(2.2) Supplier role activation:

The user may activate the supplier role via the human-machine interface; When the user's supplier role is in an activated state, this indicates that the user is willingly to provide the networking transfer service for other users who need the service according to values of items of the "supplier information field" in the present terminal;

When the function of the supplier terminal of the networking transfer service is built in a dedicated terminal of the present service, for example, when the function of the networking transfer service is built in a MIFI terminal or portable router terminal similar to the MIFI, the aforesaid operation of activating the supplier role may be deemed to have been completed by default;

After the user's supplier role is in the activated state, the user terminal, according to a current state of the user terminal and a value of the "supplier information field", judges whether the wireless hotspot module of the user terminal has a condition for activating the supplier wireless hotspot;

(2.3) Supplier wireless hotspot activation:

The networking transfer service terminal judges whether the user terminal currently has a condition for activating the supplier wireless hotspot; the activating conditions comprise: the user terminal currently has online networking with the Internet; and the current user terminal may activate the wireless hotspot under the condition of maintaining online networking with the Internet;

When the service terminal currently has the condition for activating the supplier wireless hotspot, execute the following steps: The service terminal detects whether the wireless hotspot module of the present terminal has already been activated;

When the wireless hotspot module has not yet been activated, the present service terminal activates the wireless hotspot of the terminal according to a "supplier wireless hotspot activation scheme";

When the wireless hotspot module has already been activated, the service terminal closes the wireless hotspot, and re-activates the wireless hotspot according to the "supplier wireless hotspot activation scheme";

The "supplier wireless hotspot activation scheme" is: the service terminal reads the current "supplier SSID" codeword from the "supplier information field" storage space, invokes a supplier SSID codeword-login password codeword mapping rule preset in the system, and calculates a corresponding login password codeword according to the current "supplier SSID" codeword; subsequently, the service terminal activates the wireless hotspot of the terminal and sets the aforesaid "supplier SSID" codeword and the corresponding login password codeword as the SSID and login password of the wireless hotspot of the present terminal;

Subsequently, the service terminal executes step (2.4) "supplier service information reporting";

For example, the supplier SSID codeword-login password codeword mapping rule preset in the system may be: the character string of the "supplier SSID" codeword is converted according to an ASCII code value of each character into an array A, A={a1, a2, a3, a4, . . . }, and the number of elements in the array A is a character string length of the "supplier SSID" codeword; an array B corresponding to the array A is set in a way that B={b1, b2, b3, b4, . . . }, wherein the number of elements in the array B is equal to the number of elements in the array A, and bn=an mod K; a value of bn taken from 0 to 61 is set to in turn correspond to characters 0-9, A to Z, and a to z; according to the correspondence relationship, the array B is converted into a character string (B1, B2, B3, B4, B5, B6 . . . ) from which the first character and subsequent $2*N+1^{th}$ character (N=0, 1, 2, . . . ) are taken to obtain a character string (P1, P2, P3, . . . )=(B1, B3, B5, . . . ), and the newly-generated character string (P1, P2, P3, . . . ) is regarded as a codeword of the login password of the supplier wireless hotspot;

(2.4) Supplier service information reporting:

The networking transfer service terminal reports the "supplier role service message" to the networking transfer sever; the message contains various information content of the user in the "supplier information field" storage space;

After receiving the "supplier role service information" reported by the present service terminal, the networking transfer server stores content in the message in the "supplier information field" storage space for the user on the server side;

(2.5) Supplier information setting alteration:

Upon completion of the user's supplier information initial setting, the user terminal may display values of the "supplier information field" via the human-machine interface, and the user may alter values of other various information in the "supplier information field" except for the "supplier SSID";

After the user alters the values of the information in the "supplier information field", the user terminal stores the altered values of information in the "supplier information field" storage space of the present terminal; and executes the following steps:

(2.5.1) If the information altered by the user does not include the "service unit price of the networking transfer service provided by the user", executing step (2.4) "supplier service information reporting";

(2.5.2) If the information altered by the user includes the "service unit price of the networking transfer service provided by the user", according to a service supplier feature code as appointed by the whole system, the user's feature identification code and "service unit price of the networking transfer service provided by the user" in the "supplier information field", the user terminal, according to a supplier SSID codeword encoding rule preset in the system, generates a codeword of the supplier wireless hotspot service identification, namely, "supplier SSID" codeword, including information of the service supplier feature code as appointed by the whole system, the user's feature identification code information and information of "service unit price of the networking transfer service provided by the user";

The user terminal stores the aforesaid newly-generated "supplier SSID" codeword in the "supplier information field" storage space of the present terminal; subsequently, the user terminal executes the aforesaid step (2.3) "supplier wireless hotspot activation".

(3) Establishing the networking transfer service:

(3.1) Searching for the supplier wireless hotspot:

(3.1.1) Sending a networking transfer service request to the networking transfer service demander management module of the networking transfer service terminal;

Manner A of sending the request: in the case that the user terminal is in an offline state, or terminal is not in a signal service area, or the user's traffic plan has already depleted, when the user has a need to access to the Internet, the demander user may, via the human-machine interface of the terminal, send a networking transfer service request to the networking transfer service demander management module of the networking transfer service terminal;

Manner B of sending the request: in the case that the networking transfer service is built in or associated with other application services, when said other application services need to access to the Internet but fail to connect with the network, said other application services may also send a networking transfer service request to the networking transfer service demander management module of the networking transfer service terminal;

(3.1.2) After the networking transfer service demander management module of the networking transfer service terminal receives the networking transfer service request, the networking transfer service terminal, as the demander terminal of the networking transfer service, executes the following steps:

(3.1.2.1) Detecting whether the WLAN module of the terminal has already been activated; when the WLAN module has not yet been activated, activating the WLAN module of the terminal;

(3.1.2.2) Searching for nearby networking transfer service supplier wireless hotspot; a codeword of the SSID of the networking transfer service supplier wireless hotspot, namely, the "supplier SSID" contains the service supplier feature code information as appointed by the whole system;

(3.1.2.2.1) In the event of failure to find the networking transfer service supplier wireless hotspot, the demander terminal notifies the demander user via the human-machine interface that currently there is no supplier user capable of supplying the networking transfer service nearby;

(3.1.2.2.2) If the networking transfer service supplier wireless hotspot is found after the search, step (3.2) selecting a supplier is executed;

(3.2) Selecting a supplier: The networking transfer service demander management module of the demander terminal extracts supplier service unit price information from the codeword of the found supplier wireless hotspot SSID to form a copy of currently-available supplier listing; the copy of listing may include the following information of the supplier: supplier SSID, supplier service unit price, and supplier wireless quality;

The demander terminal displays information in the currently-available supplier listing on the human-machine interface; the user may select the supplier from the supplier listing via the human-machine interface;

(3.3) Logging in the supplier wireless hotspot:

(3.3.1) The networking transfer service demander management module of the demander terminal invokes a supplier SSID codeword-login password codeword mapping rule preset in the system, and calculates a corresponding password according to the supplier SSID codeword currently selected by the user; the demander terminal uses the calculated password to log in the supplier wireless hotspot; the supplier terminal allocates an IP address to the login terminal and establishes wireless connection.

(3.3.2) The routing control module of the supplier terminal has an IP and port filtering function, permits and only permits a communication message between the login terminal and the networking transfer server;

(3.3.3) The demander terminal activates demander user authentication;

(3.4) Executing the demander user authentication;

Specific steps of the demander user authentication are as follows:

(3.4.1) The demander user sends a server authentication request message to the networking transfer server, and the message at least includes a randomly-generated character string;

(3.4.2) After receiving the server authentication request message sent from the demander terminal, the authentication function module of the networking transfer server replies a server authentication response message to the demander, the message at least comprising a specific character string relevant to the aforesaid randomly-generated character string;

(3.4.3) The demander terminal checks content of the server authentication response message;

(3.4.4) If the check does not pass, the demander terminal returns to the networking transfer server a message to the effect that the server authentication request fails to pass, and then the demander terminal disconnects the wireless connection with the current supplier terminal;

(3.4.5) If the check passes, the demander terminal sends the user authentication request message to the networking transfer server, the message may include: a sole user identifier of the whole system of the demander, a system login password of the demander, "supplier SSID" of the demander's current login, an IP address allocated by the supplier terminal to the supplier terminal or an MAC address of the supplier terminal;

(3.4.6) After receiving the user authentication request message sent from the demander, the authentication function module of the networking transfer server performs authentication processing: specifically, confirming the user's identification according to related information in the user authentication request message, and checking the user's credit conditions, and thereby judging whether to permit the user authentication request to pass;

(3.4.7) If the user authentication request has passed, the server sends to the supplier terminal currently providing the transfer service an acknowledgement message that the demander user authentication request has passed; content of the message contains: an IP address allocated by the supplier terminal to the demander terminal or an MAC address of the demander terminal;

(3.4.8) If the user authentication request has not passed, the networking transfer server returns, to the demander terminal, information that the user authentication request has not passed; then the server sends to the supplier terminal currently providing the transfer service an acknowledgement message that the demander user authentication request has not passed, and content of the message contains: an IP address allocated by the supplier terminal to the demander terminal or an MAC address of the demander terminal; after receiving the message that the authentication request has not passed, the supplier terminal disconnects wireless connection with the demander terminal.

For example, specific steps of the demander user authentication are as follows:

(3.4.1) The demander terminal sends the user authentication request message to the networking transfer server, the message may include: a sole user identifier of the whole system of the demander, a system login password of the demander, "supplier SSID" of the demander's current login, an IP address allocated by the supplier terminal to the supplier terminal or an MAC address of the supplier terminal;

(3.4.2) After receiving the user authentication request message sent from the demander, the authentication function module of the networking transfer server performs authentication processing: specifically, confirming the user's identification according to related information in the user authentication request message, and checking the user's credit conditions, and thereby judging whether to permit the user authentication request to pass;

(3.4.3) If the user authentication request has passed, the server sends to the supplier terminal currently providing the transfer service an acknowledgement message that the demander user authentication request has passed; content of the message contains: an IP address allocated by the supplier terminal to the demander terminal or an MAC address of the demander terminal;

(3.4.4) If the user authentication request has not passed, the networking transfer server returns, to the demander terminal, information that the user authentication request has not passed; then the server sends to the supplier terminal currently providing the transfer service an acknowledgement message that the demander user authentication request has not passed, and content of the message contains: an IP address allocated by the supplier terminal to the demander terminal or an MAC address of the demander terminal; after receiving the information that the authentication request has not passed, the supplier terminal disconnects wireless connection with the demander terminal.

(3.5) Providing access to the Internet for the demander user:

After the networking transfer service supplier management module receives the "acknowledgement message that the demander user authentication has passed" sent from the networking transfer server, (3.5.1) Solution 1 (thinks by default that the supplier user provides charging service):

The networking transfer service supplier management module of the supplier terminal instructs the routing control module of the present terminal to permit all Internet transceiving messages of the demander terminal, and at the same time, instructs the charging module of the supplier terminal to activate the charging operation.

(3.5.2) Solution 2 (which enables the supplier user to select a service manner):

The supplier terminal, via the human-machine interface, displays the aforesaid demander user information which has already passed authentication, and related information may contain the following information of the demander: the demander user name;

The supplier user may, via the human-machine interface, make the following selection with respect to the demander's demands for the networking transfer service:

option A: providing charging service; option B: free service; option C: refusing to provide service; option D: timer default selection;

Wherein a technical solution of option D, namely, timer default selection, is: the terminal human-machine interface displays countdown from N seconds, wherein N may be a certain time length in a range from 2 seconds to 20 seconds, for example, N=3 seconds, or 5 seconds, or 8 seconds or 10 seconds; when the countdown reaches 0 second, if the user still does not make any selection from A or B or C, the supplier terminal thinks by default that selection made by the user is the aforesaid option A, namely, providing the charging service;

If the supplier user selects A:

The networking transfer service supplier management module of the supplier terminal instructs the routing control module of the present terminal to permit all Internet transceiving messages of the demander, and at the same time, instructs the charging module of the present terminal to activate the charging operation;

If the supplier user selects B:

The networking transfer service supplier management module of the supplier terminal instructs the routing control module of the present terminal to permit all Internet transceiving messages of the demander; the supplier terminal sends a notification message that "service of this time is free" respectively to the demander terminal and the networking transfer server;

If the supplier user selects C:

The supplier refuses to provide networking transfer service to the demander; a specific flow is as follows:

the supplier terminal sends a request message to "terminate service of this time" respectively to the demander terminal and the server;

after receiving the request to "terminate service of this time" sent from the supplier terminal, the demander terminal sends a message of "terminating service of this time" to the server, and then disconnects wireless connection with the supplier;

After receiving the message of "terminating service of this time" sent from the demander terminal, the server sends an acknowledge message of "terminating service of this time" to the currently-serving supplier terminal;

After receiving the acknowledge message of "terminating service of this time" sent from the server, the supplier terminal disconnects connection with the demander and sends the acknowledge message of "terminating service of this time" to the server.

The above shows an optional flow of solution 2 and is intended to provide an opportunity of selection for the supplier.

(4) Charging the networking transfer service:

(4.1) A charging module of the supplier terminal measures communication traffic and communication time length between the supplier terminal and the Internet as exported by the supplier terminal for the transfer service of this time, and forms in real time a charging recording list according to a measurement result; In all Internet traffic of itself, the supplier terminal distinguishes Internet traffic generated by the demander user and thereby measure it by distinguishing the MAC address or IP address of the demander terminal;

The charging recording list may include the following content: demander user name, supplier user name, supplier SSID, a recording time point, already-spent traffic, corresponding time length and corresponding sum at the corresponding time point; wherein, the recording time point may be as precise as 1 MS level or a multiple of 1 MS;

(4.2) The supplier terminal sends in real time the current charging recording list to the demander terminal, and meanwhile the supplier terminal sends the charging recording list to the networking transfer server in real time;

(4.3) According to the charging recording list received from the supplier terminal, the demander terminal, via the human-machine interface, displays information such as already-consumed traffic, corresponding time length and corresponding sum of the transfer service of this time at the current moment; wherein the already-consumed traffic and corresponding time length of the demander are equal to already-exported traffic and corresponding time length in the charging recording list sent from the supplier;

(4.4) The demander terminal sends to the networking transfer server in real time the current charging recording list already displayed on the human-machine interface of the demander terminal;

(4.5) After receiving the current charging recording list sent from the demander terminal, the networking transfer server stores it and sends it to the supplier terminal;

(4.6) After receiving the charging recording list sent from the networking transfer server, the supplier terminal may display, on the human-machine interface, information such as already-exported traffic, corresponding time length and corresponding income sum of the transfer service of this time; that is, if the supplier terminal displays the charging information in real time, the displayed information comes from the current charging recording list sent by the networking transfer server to the supplier terminal.

(5) Terminating the networking transfer service:

(5.1) After sending a networking transfer service request to the networking transfer service terminal, the demander user may, at any time and via the human-machine interface, send a request to "terminate the service of this time" to the demander client; the networking transfer service terminal, as the demander terminal, receives the request to "terminate service of this time" sent from the user, (5.1.1) If a message has not yet sent to the networking transfer server, stopping sending the message and disconnecting wireless connection with the supplier; the step ends up.

(5.1.2) If the message has already sent to the networking transfer server, but charging has not yet begun, the demander terminal sends a request message of "terminating service of this time" to the networking transfer server; and then disconnects wireless connection with the supplier; the step ends up.

(5.1.3) If charging has already begun, the following steps will be executed:

A: After receiving the request to "terminate service of this time", the demander terminal immediately pauses real-time flicker display of the current charging information, meanwhile stops sending the charging recoding list to the networking transfer server, and sends the request message of "terminating service of this time" to the server; then disconnects wireless connection with the supplier;

B: After receiving the request message of "terminating service of this time" reported by the demander, the server sends the message of "terminating service of this time" to the currently-serving supplier terminal;

C: after receiving the message of "terminating service of this time" from the server, the supplier terminal immediately stops sending the charging recording list to the demander terminal and the server, and closes wireless connection with the demander, and then sends the acknowledgement message of "terminating service of this time" to the server; if the supplier terminal has real-time flicker display of the current charging information on the human-machine interface, the real-time flicker display of the current charging information will be paused immediately; the flow ends up.

Or, (5.2) After the supplier terminal begins to provide the networking transfer service to the demander user, the supplier user may, at any time and via the human-machine interface, send the request to "terminate service of this time" to the networking transfer service supplier management module of the supplier terminal; A: After the networking transfer service supplier management module of the supplier terminal receives the request to "terminate service of this time" from the human-machine interface, the supplier terminal immediately stops sending the charging recoding list to the supplier terminal and the networking transfer server, and the routing control module of the supplier terminal employs an IP or port filtering function and permits and only permits a communication message between the supplier terminal and the networking transfer server; the supplier terminal sends the request message of "terminating service of this time" respectively to the demander terminal and the networking transfer server; if the supplier terminal has real-time flicker display of the current charging information on the human-machine interface, the real-time flicker display of the current charging information will be paused immediately;

B: After receiving the request to "terminate service of this time" from the supplier terminal, the demander terminal immediately pauses real-time flicker display of the current charging information, and displays on the human-machine interface a prompt "service is stopped due to the supplier"; the demander terminal sends the message of "terminating the service of this time" to the server, and then disconnects the wireless connection with the supplier;

C: After receiving the message of "terminating service of this time" sent from the demander terminal, the server sends the acknowledgement message of "terminating service of this time" to the currently-serving supplier terminal;

D: After receiving the acknowledgement message of "terminating service of this time" from the server, the supplier terminal disconnects wireless connection with the demander, and then sends the acknowledgement message of "terminating service of this time" to the server;

Or, (5.3) If the supplier role of the user is in an activated state, the user may, at any time and via the human-machine interface, deactivates the supplier role, and the networking transfer service supplier management module of the networking transfer service terminal will receive a request to "deactivate the supplier role"; furthermore, if the user, via the human-machine interface, sends the networking transfer service request to the networking transfer service supplier management module of the networking transfer service terminal, or if the networking transfer service is built in or associated other application services send the networking transfer service request to a networking transfer service demander management module of the networking transfer service terminal, upon the user's confirmation, the networking transfer service supplier management module of the networking transfer service terminal will receive the request to "deactivate the supplier role"; after receiving the request to "deactivate the supplier role", the networking transfer service supplier management module of the networking transfer service terminal stops judging whether a wireless hotspot module of the user terminal has a condition for activating the supplier wireless hotspot; and executes the following steps:

(5.3.1) When the networking transfer service terminal is, as the supplier terminal, providing the networking transfer service, A: The supplier terminal stops sending the charging recording list to the demander terminal and the networking transfer server, and the routing control module of the supplier terminal employs an IP or port filtering function and permits and only permits a communication message between the supplier terminal and the networking transfer server; the supplier terminal sends the request message of "terminating service of this time" respectively to the demander terminal and the networking transfer server; if the supplier terminal has real-time flicker display of the current charging information on the human-machine interface, the real-time flicker display of the current charging information will be paused immediately;

B: After receiving the request message of "terminating service of this time" from the supplier terminal, the demander terminal immediately pauses real-time flicker display of the current charging information, and displays on the human-machine interface a prompt "service is stopped due to the supplier"; the demander terminal sends the message of "terminating the service of this time" to the server, and then disconnects the wireless connection with the supplier;

C: After receiving the message of "terminating service of this time" sent from the demander terminal, the server sends the acknowledgement message of "terminating service of this time" to the currently-serving supplier terminal;

D: After receiving the acknowledgement message of "terminating service of this time" from the server, the supplier terminal disconnects wireless connection with the demander, closes the wireless hotspot module of the supply terminal, and then sends the acknowledgement message of "terminating service of this time" to the server;

(5.3.2) When the networking transfer service terminal is not providing the networking transfer service, A: If the wireless hotspot module of the terminal, as the supplier wireless hotspot of the present service, is in an activated state, it will be closed;

Or, (5.4) The networking transfer server extracts supplier service unit price information from a "supplier SSID" codeword of the supplier user, and checks it with the supplier service unit price information in the user's "supplier information field"; after the networking transfer server receives the current charging recording list respectively from the supplier terminal and the demander terminal, it checks the charging recording list information received from the supplier and the demander; and the networking transfer server judges credit conditions of the current service according to the demander's credit conditions and the charging information of the current service;

(5.4.1) If check results in the above aspects all show agreement and the credit conditions of the current service are acceptable, the charging information will be stored and acknowledged;

(5.4.2) If check results in the above aspects show disagreement in any one aspect or the credit conditions of the current service are not acceptable, the charging information will be stored and the following steps will be executed:

A: The server sends a request message of "terminating current service due to charging problem" to the demander terminal;

B: After receiving the request message of "terminating current service due to charging problem" from the server, the demander terminal immediately pauses real-time flicker display of the current charging information, and prompts the user of the following via the human-machine interface: terminate the current service due to charging problem; meanwhile, the demander terminal stops sending the charging recording list to the networking transfer server, and sends an acknowledgement message of "terminating service of this time" to the server; and then disconnects wireless connection with the supplier;

C: After receiving the acknowledgement message of "terminating service of this time" reported by the demander, the server sends the message of "terminating service of this time" to the currently-serving supplier terminal;

D: After receiving the message of "terminating service of this time" from the server, the supplier terminal immediately stops sending the charging recording list to the demander terminal and the server, disconnects wireless connection with the demander, and then sends the acknowledge message of "terminating service of this time" to the server; if the supplier terminal has real-time flicker display of the current charging information on the human-machine interface, the real-time flicker display of the current charging information will be paused immediately;

(5.5) Other abnormal terminations caused by communication interruption

Other abnormal termination occasions caused by communication interruption comprise: abnormal interruption of wireless connection between the demander and supplier, abnormal interruption of a communication link between the supplier and the Internet, interruption of wireless connection caused by supplier terminal abnormity or halt, interruption of wireless connection caused by demander terminal abnormity or halt, or the like.

The above-mentioned other abnormal terminal occasions caused by communication interruption will cause message communication abnormity between the supplier terminal and the demander terminal, for example, one party fails to receive a reply message or acknowledgement message from the other party within a range set by a timer.

When the networking transfer service terminal detects communication abnormity, no new charging information will be output any more; and if the networking transfer service terminal has real-time flicker display of the current charging information on the human-machine interface, the real-time flicker display of the current charging information will be paused immediately, and meanwhile a prompt that "service is interrupted due to communication abnormity" is displayed to the user on the human-machine interface.

This is intended to try to implement consistency of the following four kinds of information during service: charging information finally displayed by the demander terminal, charging information finally displayed by the supplier terminal, the charging recording list finally sent by the demander to the server, and the charging recording list finally sent by the supplier to the server.

Those skilled in the art should appreciate that the above embodiments are only examples for illustration purpose and not for limiting purpose. Any modifications, equivalent substitutions and the like made according to the teaching of the present application and within the protection scope of the appended claims should all be included in the protection scope of the present application.

What is claimed is:

1. A method of implementing a networking transfer service system, wherein the method comprises:
   (1) a user registration comprising registering a user on the networking transfer service system by associating the user with a sole user identifier of the whole system and setting a system login password for the user so the user becomes a user of networking transfer service, wherein the user can be one or more of a demander or a supplier;
   (2) setting of supplier information for a supplier, supplier role activation comprising generating for the supplier a supplier wireless hotspot service identifier containing information of a service supplier feature code of the networking transfer service and information of service unit price of the networking transfer service provided by the supplier as a supplier SSID codeword, wherein the supplier SSID codeword comprises a SSID of a wireless hotspot module of a supplier terminal; and a supplier SSID codeword-login password codeword mapping is to be invoked by a supplier terminal according to a rule preset in the networking transfer service system to calculate a corresponding login password codeword based on the supplier SSID codeword, and set the codeword of the login password as a login password of a wireless hotspot of the supplier terminal;
   (3) establishing the networking transfer service, said establishing comprising:
      (3.1) searching for the supplier wireless hotspot:
         (3.1.1) sending a networking transfer service request to a demander terminal;
         (3.1.2) after the demander terminal receives the networking transfer service request, the demander terminal performs:
            (3.1.2.1) detecting whether a WLAN module of the demander terminal has already been activated and, in response to detecting that the WLAN module has not yet been activated, activating the WLAN module of the demander terminal; and
            (3.1.2.2) searching for a nearby networking transfer service supplier wireless hotspot;

(3.2) selecting a supplier, wherein:
the demander terminal extracts supplier service unit price information from a codeword of a searched supplier wireless hotspot SSID to form a copy of a currently-available supplier listing; the copy of the currently-available supplier listing includes at least one item of information about the supplier selected from: supplier SSID, supplier service unit price, and supplier wireless quality;
the demander terminal displays information in the currently-available supplier listing on a human-machine interface of the demander terminal for demander user selection of the supplier from the supplier listing via the human-machine interface of the demander terminal;
(3.3) logging into the supplier wireless hotspot, wherein:
(3.3.1) the networking transfer service demander management module invokes a supplier SSID codeword-login password codeword mapping rule preset in the networking transfer service system, and calculates a corresponding password codeword according to the supplier SSID codeword currently selected by the demander; the WLAN module of the demander terminal uses the login password codeword to log into the supplier wireless hotspot currently selected by the demander;
(3.3.2) a routing control module of the supplier terminal permits only a communication message between the current login demander terminal and the networking transfer server; and
(3.3.3) the demander terminal activates demander authentication;
(3.4) executing a user authentication of the demander;
(3.5) providing access to the Internet for the demander, wherein:
after receiving an acknowledgement message that the user authentication has passed sent from the networking transfer server, the supplier terminal establishes, by default, that the supplier provides charging services, and
the routing control module of the supplier terminal permits all Internet transceiving messages of the demander terminal and, concurrently, a charging module of the supplier terminal activates a networking transfer service charging operation;
(4) executing the networking transfer service charging operation; and
(5) terminating the networking transfer service, wherein termination of the networking transfer service is classified into normal termination or abnormal termination.

2. The method of implementing networking transfer service system according to claim 1, wherein the sole user identifier of the full system of step (1) is a registered user name; the system login password is a password comprising a character string, or a user-specific human body feature comprising one or more of a: fingerprint, face, or voice.

3. The method of implementing networking transfer service system according to claim 1, wherein in said step (1), the networking transfer service terminal and the networking transfer system server store information related to the user registration; when the networking transfer service is built in or associated with other application services, the user shares information registered for the present networking transfer service with said other application services, and said registration step is deemed as having been completed by default.

4. The method of implementing networking transfer service system according to claim 1, wherein said step (2) further comprises:
(2.1) initial setting of supplier information upon completion of the user registration of the supplier:
upon completion of the user registration of the supplier, the networking transfer server opens a supplier information field storage space for the supplier on the service side, and endows a default value to each information field in the supplier information field storage space except for the supplier SSID codeword, wherein the supplier information field storage space contains a service unit price of the networking transfer service provided by the supplier to the demander;
the networking transfer server sends supplier information initial setting message to the supplier terminal, and content of the message contains default values in the supplier information field except for the supplier SSID codeword;
after the supplier terminal receives supplier information initial setting message, the message content is stored in the supplier information field storage space; according to a service supplier feature code as appointed by the whole system, a feature identification code of the supplier and service unit price of the networking transfer service provided by the supplier in the supplier information field, the supplier terminal, according to a supplier SSID codeword encoding rule preset in the system, generates a codeword of the supplier wireless hotspot service identification comprising the supplier SSID codeword, including information of the service supplier feature code as appointed by the whole system, the feature identification code of the supplier information and information of service unit price of the networking transfer service provided by the supplier;
the supplier terminal stores the newly-generated supplier SSID codeword in the supplier information field storage space, and reports a supplier role service message to the networking transfer server, the supplier role service message comprising various information content in the supplier information field, including the newly-generated supplier SSID codeword;
the networking transfer server stores the supplier role service message sent from the supplier terminal in the supplier information field storage space for the supplier on the server side;
(2.2) supplier role activation:
the supplier activates the supplier role via a human-machine interface, wherein;
when the supplier's supplier role is in an activated state, this indicates that the supplier is willing to provide the networking transfer service for other users who need the service according to values of items of the supplier information field in the supplier terminal;
when the function of the supplier terminal of the networking transfer service is built in a dedicated supplier terminal of the networking transfer service, the said operation of activating the supplier role is deemed to have been completed by default;
after the supplier's supplier role is in the activated state, the supplier terminal, according to a current state of the supplier terminal and a value of the supplier information field, judges whether the wireless hotspot module of the supplier terminal has a condition for activating the supplier wireless hotspot;

(2.3) supplier wireless hotspot activation, wherein:
when supplier terminal currently has the condition for activating the supplier wireless hotspot, said wireless hotspot activation comprises:
detecting whether the wireless hotspot module of the supplier terminal has already been activated;
when the wireless hotspot module has not yet been activated, the supplier terminal activates the wireless hotspot of the supplier terminal according to a supplier wireless hotspot activation scheme;
when the wireless hotspot module has already been activated, the supplier terminal closes the wireless hotspot, and re-activates the wireless hotspot according to the supplier wireless hotspot activation scheme;
subsequently, the supplier terminal executes step (2.4) supplier service information reporting;

(2.4) supplier service information reporting, wherein:
the supplier terminal reports the supplier role service message to the networking transfer sever; the message contains various information content of the supplier in the supplier information field storage space;
after receiving the supplier role service information reported by the supplier terminal, the networking transfer server stores content in the message in the supplier information field storage space for the supplier on the server side;

(2.5) supplier information setting alteration, wherein:
upon completion of the supplier's supplier information initial setting, the supplier terminal displays values of the supplier information field via the human-machine interface, allowing the supplier to alter values of other various information in the supplier information field except for the supplier SSID;
after the supplier alters the values of the information in the supplier information field, the supplier terminal stores the altered values of information in the supplier information field storage space of the supplier terminal; and executes the following steps:
(2.5.1) if the information altered by the supplier does not include the service unit price of the networking transfer service provided by the supplier, executing step (2.4) supplier service information reporting;
(2.5.2) if the information altered by the supplier includes the service unit price of the networking transfer service provided by the supplier,
according to a service supplier feature code as appointed by the whole system, the supplier's feature identification code and service unit price of the networking transfer service provided by the user in the supplier information field, the supplier terminal, according to a supplier SSID codeword encoding rule preset in the system, generates a codeword of the supplier wireless hotspot service identification comprising the supplier SSID codeword, including information of the service supplier feature code as appointed by the whole system, the supplier's feature identification code information and information of service unit price of the networking transfer service provided by the user;
the supplier terminal stores the said newly-generated supplier SSID codeword in the supplier information field storage space on the terminal side; subsequently, the supplier terminal executes the said step (2.3) supplier wireless hotspot activation.

5. The method of implementing networking transfer service system according to claim 4, wherein the information field in said step (2.1) is a roaming location range, a time range and a terminal power amount range where the wireless hotspot module of the supplier terminal is activated as the supplier wireless hotspot, a service unit price of the networking transfer service provided by the supplier, and supplier SSID codeword.

6. The method of implementing networking transfer service system according to claim 4, wherein
the condition for activating as stated in said step (2.3) comprises: the supplier terminal currently has online networking with the Internet; and currently the supplier terminal activates the wireless hotspot under the condition of maintaining online networking with the Internet;
the supplier wireless hotspot activation scheme in said step (2.3) is: the supplier terminal reads the current supplier SSID codeword from the supplier information field storage space, invokes a supplier SSID codeword-login password codeword mapping rule preset in the system, and calculates a corresponding login password codeword according to the current supplier SSID codeword; subsequently, the supplier terminal activates the wireless hotspot module and sets the said supplier SSID codeword and the corresponding login password codeword as the SSID and login password of the wireless hotspot of the supplier terminal.

7. The method of implementing networking transfer service system according to claim 1, wherein sending the request as stated in said step (3.1.1) comprises:
manner A of sending the request: in the case that the demander terminal is in an offline state, or the demander terminal is not in a signal service area, or the demander's traffic plan has already depleted, when the demander has a need to access to the Internet, the demander, via a human-machine interface of the demander terminal, sends a networking transfer service request to the networking transfer service demander management module of the networking transfer service terminal;
manner B of sending the request: in the case that the networking transfer service is built in or associated with other application services, when said other application services need to access to the Internet but fail to connect with the network, said other application services also send the networking transfer service request to the networking transfer service demander management module of the networking transfer service terminal.

8. The method of implementing networking transfer service system according to claim 1, wherein said step (3.1.2.2) comprises:
(3.1.2.2.1) in the event of failure to find the networking transfer service supplier wireless hotspot after a search, the demander terminal notifies the demander via the human-machine interface that currently there is no supplier capable of supplying the networking transfer service nearby;
(3.1.2.2.2) if the networking transfer service supplier wireless hotspot is found after the search, step (3.2) selecting a supplier is executed.

9. The method of implementing networking transfer service system according to claim 1, wherein said step (3.4) further comprises:

(3.4.1) the demander sends a server authentication request message to the networking transfer server, and the message at least includes a randomly-generated digit or character string;

(3.4.2) after receiving the server authentication request message sent from the demander terminal, an authentication function module of the networking transfer server replies with a server authentication response message to the demander, the server authentication response message at least comprising a specific digit or character string which is relevant to the said randomly-generated digit or character string;

(3.4.3) the demander terminal checks content of the server authentication response message;

(3.4.4) if the check does not pass, the demander terminal returns to the networking transfer server a message to the effect that the server authentication request fails to pass, and then the demander terminal disconnects wireless connection with the current supplier terminal;

(3.4.5) if the check passes, the demander terminal sends the user authentication request message to the networking transfer server, the message including: a sole user identifier of the whole system of the demander, a system login password of the demander, supplier SSID of the demander's current login, an IP address allocated by the supplier terminal to the supplier terminal or an MAC address of the supplier terminal;

(3.4.6) after receiving the user authentication request message sent from the demander, the authentication function module of the networking transfer server performs authentication processing comprising: confirming the user's identification according to related information in the user authentication request message, and checking the user's credit conditions, and thereby judging whether to permit the user authentication request to pass;

(3.4.7) if the user authentication request has passed, the server sends to the supplier terminal currently providing the transfer service an acknowledgement message that the demander the user authentication request has passed; the acknowledgement message comprising: an IP address allocated by the supplier terminal to the demander terminal or an MAC address of the demander terminal;

(3.4.8) if the user authentication request has not passed, the networking transfer server returns, to the demander terminal, information that the user authentication request has not passed; then the server sends to the supplier terminal currently providing the transfer service an acknowledgement message that the demander the user authentication request has not passed, and content of the acknowledgement message comprises: an IP address allocated by the supplier terminal to the demander terminal or an MAC address of the demander terminal; after receiving the acknowledgement message that the authentication request has not passed, the supplier terminal disconnects wireless connection with the demander terminal.

10. The method of implementing networking transfer service system according to claim 1, wherein said step (4) further comprises:

(4.1) a charging module of the supplier terminal measures communication traffic and communication time length between the supplier terminal and the Internet as exported by the supplier terminal for the transfer service of this time, and forms in real time a charging recording list according to a measurement result; the charging recording list including: demander name, supplier name, supplier SSID, a recording time point, already-spent traffic, corresponding time length and corresponding sum at the corresponding time point;

(4.2) the supplier terminal sends in real time the current charging recording list to the demander terminal, and meanwhile the supplier terminal sends the charging recording list to the networking transfer server in real time;

(4.3) according to the charging recording list received from the supplier terminal, the demander terminal, via the human-machine interface, displays information indicative of already-consumed traffic, corresponding time length and corresponding sum of the transfer service of this time at the current moment;

(4.4) the demander terminal sends to the networking transfer server in real time the current charging recording list already displayed on the human-machine interface of the demander terminal;

(4.5) after receiving the current charging recording list sent from the demander terminal, the networking transfer server sends the current charging recording list to the supplier terminal;

(4.6) after receiving the charging recording list sent from the networking transfer server, the supplier terminal displays, on the human-machine interface, information comprising already-exported traffic, corresponding time length and corresponding income sum of the transfer service of this time; if the supplier terminal displays the charging information in real time, the displayed information comes from the current charging recording list sent by the networking transfer server to the supplier terminal.

11. The method of implementing networking transfer service system according to claim 1, wherein said normal termination in said step (5) comprises:

(5.1) after sending a networking transfer service request to the networking transfer service terminal, the demander, at any time and via the human-machine interface, sends a request to terminate the service of this time to the networking transfer service terminal;

when the demander terminal receives the request to terminate service of this time sent from the demander, (5.1.1) if the demander terminal has not yet sent a message to the networking transfer server, stopping sending the message and disconnecting wireless connection with the supplier;

(5.1.2) if the networking transfer service terminal has already sent a message to the networking transfer server, but charging has not yet begun, the demander terminal sends a request message of terminating service of this time to the networking transfer server; and then disconnects wireless connection with the supplier;

(5.1.3) if charging has already begun, the following steps will be executed:

A: after receiving the request to terminate service of this time, the demander terminal immediately pauses real-time flicker display of the current charging information, meanwhile stops sending the charging recoding list to the networking transfer server, and sends the request message of terminating service of this time to the server; then disconnects wireless connection with the supplier;

B: after receiving the request message of terminating service of this time reported by the demander, the server sends the message of terminating service of this time to the currently-serving supplier terminal;

C: after receiving the message of terminating service of this time from the server, the supplier terminal immediately stops sending the charging recording list to the demander terminal and the server, and closes wireless connection with the demander, and then sends the acknowledgement message of terminating service of this time to the server; if the supplier terminal has real-time flicker display of the current charging information on the human-machine interface, the real-time flicker display of the current charging information will be paused immediately;

or, (5.2) after the supplier terminal begins to provide the networking transfer service to the demander, the supplier, at any time and via the human-machine interface, sends the request to terminate service of this time to the supplier terminal;

A: after the supplier terminal receives the request to terminate service of this time from the human-machine interface, the supplier terminal immediately stops sending the charging recoding list to the supplier terminal and the networking transfer server, and the routing control module of the supplier terminal employs an IP or port filtering function and only permits a communication message between the supplier terminal and the networking transfer server; the supplier terminal sends the request message of terminating service of this time respectively to the demander terminal and the networking transfer server; if the supplier terminal has real-time flicker display of the current charging information on the human-machine interface, the real-time flicker display of the current charging information will be paused immediately;

B: after receiving the request to terminate service of this time from the supplier terminal, the demander terminal immediately pauses real-time flicker display of the current charging information, and displays on the human-machine interface a prompt indicating service is stopped due to the supplier; the demander terminal sends the message indicative of terminating the service of this time to the server, and then disconnects the wireless connection with the supplier;

C: after receiving the message indicative of terminating service of this time sent from the demander terminal, the server sends the acknowledgement message indicative of terminating service of this time to the currently-serving supplier terminal;

D: after receiving the acknowledgement message indicative of terminating service of this time from the server, the supplier terminal disconnects wireless connection with the demander, and then sends the acknowledgement message indicative of terminating service of this time to the server;

or, (5.3) when the supplier role of the supplier is in an activated state, the supplier may deactivates the supplier role at any time; after receiving the request to deactivate the supplier role, the demander terminal stops judging whether a wireless hotspot module of the supplier terminal has a condition for activating the supplier wireless hotspot; and executes the following steps:

(5.3.1) when the supplier terminal is providing the networking transfer service, A: the supplier terminal stops sending the charging recording list to the demander terminal and the networking transfer server, and the routing control module of the supplier terminal employs an IP or port filtering function and permits and only permits a communication message between the supplier terminal and the networking transfer server; the supplier terminal sends the request message indicative of terminating service of this time respectively to the demander terminal and the networking transfer server; if the supplier terminal has real-time flicker display of the current charging information on the human-machine interface, the real-time flicker display of the current charging information will be paused immediately;

B: after receiving the request message indicative of terminating service of this time from the supplier terminal, the demander terminal immediately pauses real-time flicker display of the current charging information, and displays on the human-machine interface a prompt indicating service is stopped due to the supplier; the demander terminal sends the message indicative of terminating the service of this time to the server, and then disconnects the wireless connection with the supplier;

C: after receiving the message indicative of terminating service of this time sent from the demander terminal, the server sends the acknowledgement message indicative of terminating service of this time to the currently-serving supplier terminal;

D: after receiving the acknowledgement message indicative of terminating service of this time from the server, the supplier terminal disconnects wireless connection with the demander, closes the wireless hotspot module of the supplier terminal, and then sends the acknowledgement message indicative of terminating service of this time to the server;

(5.3.2) when the supplier terminal is not providing the networking transfer service, A: if the wireless hotspot module of the supplier terminal, as the supplier wireless hotspot of the present service, is in an activated state, it will be closed;

or, (5.4) the networking transfer server extracts supplier service unit price information from a supplier SSID codeword of the supplier, and checks it with the supplier service unit price information in the supplier's supplier information field; after the networking transfer server receives the current charging recording list respectively from the supplier terminal and the demander terminal, it checks the charging recording list information received from the supplier and the demander; and the networking transfer server judges credit conditions of the current service according to the demander's credit conditions and the charging information of the current service;

(5.4.1) if check results in the above aspects all show agreement and the credit conditions of the current service are acceptable, the charging information will be stored and acknowledged;

(5.4.2) if check results in the above aspects show disagreement in any one aspect or the credit conditions of the current service are not acceptable, the charging information will be stored and the following steps will be executed:

A: the server sends a request message indicative of terminating current service due to charging problem to the demander terminal;

B: after receiving the request message indicative of terminating current service due to charging problem from the server, the demander terminal immediately pauses real-time flicker display of the current charging information, and prompts the demander of the following via the human-machine interface: terminate the current service due to charging problem; meanwhile, the demander terminal stops sending the charging recording list to the networking transfer server, and sends an acknowledgement message indicative of terminating service of this time to the server; and then disconnects wireless connection with the supplier;

C: after receiving the acknowledgement message indicative of terminating service of this time reported by the demander, the server sends the message indicative of terminating service of this time to the currently-serving supplier terminal;

D: after receiving the message indicative of terminating service of this time from the server, the supplier terminal immediately stops sending the charging recording list to the demander terminal and the server, disconnects wireless connection with the demander, and then sends the acknowledge message indicative of terminating service of this time to the server; if the supplier terminal has real-time flicker display of the current charging information on the human-machine interface, the real-time flicker display of the current charging information will be paused immediately.

12. The method of implementing networking transfer service system according to claim 1, wherein said abnormal termination in said step (5) comprises:

(5.5) other abnormal terminations caused by communication interruption a. abnormal interruption of wireless connection between the demander and supplier, b. abnormal interruption of a communication link between the supplier and the Internet, c. interruption of wireless connection caused by supplier terminal abnormity or halt, d. interruption of wireless connection caused by demander terminal abnormity or halt;

the other abnormal terminations caused by communication interruption cause message communication abnormity between the supplier terminal and the demander terminal;

when the supplier terminal and/or the demander terminal detects communication abnormity, no new charging information will be output any more; and if the supplier terminal and/or the demander terminal has real-time flicker display of the current charging information on the human-machine interface, the real-time flicker display of the current charging information will be paused immediately, and meanwhile a prompt that service is interrupted due to communication abnormity is displayed to the supplier and/or the demander on the human-machine interface.

13. The method of implementing networking transfer service system according to claim 12, wherein the message communication abnormity comprises: one party fails to receive a reply message or acknowledgement message from the other party within a range set by a timer.

14. The method of implementing networking transfer service system according to claim 1, wherein said step (3.5) further comprise:

enabling the supplier to select a service manner:

the supplier terminal, via a human-machine interface, displays the said demander information which has already passed authentication, and related information may contain the following information of the demander: the demander name;

the supplier may, via the human-machine interface, make the following selection with respect to the demander's demands for the networking transfer service: option A: providing charging service; option B: free service; option C: refusing to provide service; option D: timer default selection;

wherein a technical solution of option D, namely, timer default selection, is: the terminal human-machine interface displays countdown from N seconds, wherein N may be a certain time length in a range from 2 seconds to 20 seconds, for example, N=3 seconds, or 5 seconds, or 8 seconds or 10 seconds; when the countdown reaches 0 second, if the supplier still does not make any selection from A or B or C, the supplier terminal determines, by default, that selection made by the user is said option A, providing the charging service;

if the supplier selects A:

the routing control module of the supplier terminal permits all Internet transceiving messages of the demander, and concurrently, the charging module of the supplier terminal begins to execute the charging operation;

if the supplier selects B:

the routing control module of the supplier terminal permits all Internet transceiving messages of the demander; the supplier terminal sends a notification message indicating that service of this time is free respectively to the demander terminal and the networking transfer server;

if the supplier selects C:

the supplier refuses to provide networking transfer service to the demander;

a specific flow comprises:

the supplier terminal sends a request message to terminate service of this time respectively to the demander terminal and the server;

after receiving the request to terminate service of this time sent from the supplier terminal, the demander terminal sends a message indicative of terminating service of this time to the server, and then disconnects wireless connection with the supplier;

after receiving the message indicative of terminating service of this time sent from the demander terminal, the server sends an acknowledge message indicative of terminating service of this time to the currently-serving supplier terminal;

after receiving the acknowledge message indicative of terminating service of this time sent from the server, the supplier terminal disconnects connection with the demander and sends the acknowledge message indicative of terminating service of this time to the server.

15. The method of implementing networking transfer service system according to claim 1, wherein the method further comprises an encrypting step in which the supplier terminal, the demander terminal, the networking transfer server, and all messages transceived between the three all make application layer encryption for message content.

16. The method of implementing networking transfer service system according to claim 1, wherein the information display or information input function of the human-machine interface of the supplier terminal and/or the demander terminal implemented by third party equipment by accessing the supplier terminal and/or the demander terminal in a network manner.

17. A networking transfer service system, comprising:
a demander terminal;
a supplier terminal; and
a networking transfer server; wherein:
the demander terminal comprises:
 a networking transfer service demander management module, and
 a human-machine interface through which a demander interacts with the demander terminal;
the supplier terminal comprises:
 a networking transfer service supplier management module;
 a human-machine interface through which a supplier interacts with the supplier terminal;
 a wireless hotspot module; and
 an Internet connection module;
wherein the supplier terminal
 is for completing the charging of the networking transfer service,
 is for completing storage of supplier information,
 employs an IP and port filtering function, and
 is configured to execute an allow operation or a forbid operation for a communication message between a specific IP source and an IP target; and
wherein the demander terminal is wirelessly connected with the wireless hotspot module of the supplier terminal and interacts with the wireless hotspot module; the supplier terminal controls connection between the wireless hotspot module and the Internet connection module; the supplier terminal is to be connected to the Internet and the networking transfer server through the Internet connection module,
wherein the supplier information comprises a supplier SSID codeword and a service unit price of the networking transfer service provided by the supplier and
wherein the system can complete a method for implementing the networking transfer service system comprising
(1) a user registration step comprising registering a user on the networking transfer service system by associating the user with a sole user identifier of the whole system and setting a system login password for the user so the user becomes a user of networking transfer service, wherein the user can be one or more of a demander or a supplier;
(2) setting of supplier information for a supplier, supplier role activation comprising generating for the supplier a supplier wireless hotspot service identifier containing information of a service supplier feature code of the networking transfer service and information of service unit price of the networking transfer service provided by the supplier as a supplier SSID codeword, wherein the supplier SSID codeword comprises a SSID of the wireless hotspot module of the supplier terminal; and a supplier SSID codeword-login password codeword mapping is to be invoked by the supplier terminal according to a rule preset in the networking transfer service system to calculate a corresponding login password codeword based on the supplier SSID codeword, and set the codeword of the login password as a login password of a wireless hotspot of the supplier terminal;
(3) establishing the networking transfer service, said establishing comprising:
 (3.1) searching for the supplier wireless hotspot:
  (3.1.1) sending a networking transfer service request to a demander terminal:
  (3.1.2) after the demander terminal receives the networking transfer service request, the demander terminal performs:
   (3.1.2.1) detecting whether a WLAN module of the demander terminal has already been activated and, in response to detecting that the WLAN module has not yet been activated, activating the WLAN module of the demander terminal; and
   (3.1.2.2) searching for a nearby networking transfer service supplier wireless hotspot;
 (3.2) selecting a supplier, wherein:
 the demander terminal extracts supplier service unit price information from a codeword of a searched supplier wireless hotspot SSID to form a copy of a currently-available supplier listing; the copy of the currently-available supplier listing includes at least one item of information about the supplier selected from: supplier SSID, supplier service unit price, and supplier wireless quality;
 the demander terminal displays information in the currently-available supplier listing on the human-machine interface of the demander terminal for demander selection of the supplier from the supplier listing via the human-machine interface of the demander terminal;
 (3.3) logging into the supplier wireless hotspot, wherein:
  (3.3.1) the networking transfer service demander management module invokes a supplier SSID codeword-login password codeword mapping rule preset in the networking transfer service system, and calculates a corresponding password codeword according to the supplier SSID codeword currently selected by the demander; the WLAN module of the demander terminal uses the login password codeword to log into the supplier wireless hotspot currently selected by the demander;
  (3.3.2) a routing control module of the supplier terminal permits only a communication message between the current login demander terminal and the networking transfer server; and
  (3.3.3) the demander terminal activates demander authentication;
 (3.4) executing the demander authentication;
 (3.5) providing access to the Internet for the demander, wherein:
 after receiving an acknowledgement message that the demander authentication has passed sent from the networking transfer server, the supplier terminal establishes, by default, that the supplier provides charging services, and
 the routing control module of the supplier terminal permits all Internet transceiving messages of the demander terminal and, concurrently, a charging module of the supplier terminal activates a networking transfer service charging operation;
(4) executing the networking transfer service charging operation; and (5) terminating the networking transfer service, wherein termination of the networking transfer service is classified into normal termination or abnormal termination.

18. The networking transfer service system according to claim 17, wherein one or more of the human-machine interface of the demander terminal or the human-machine interface of the supplier terminal is implemented by third party equipment by accessing a data interface provided, by the demander terminal for the human-machine interface of the demander terminal or by the supplier terminal for the human-machine interface of the supplier terminal in a network manner.

19. The networking transfer service system according to claim 17, wherein:
   the demander terminal is configured to generate the supplier SSID codeword containing information of a service supplier feature code of a networking transfer service and information of the service unit price of the networking transfer service; and
   the supplier terminal is configured to invoke a supplier SSID codeword-login password codeword mapping to calculate a login password codeword based on the supplier SSID codeword.

\* \* \* \* \*